United States Patent [19]
Naruse et al.

[11] Patent Number: 5,930,881
[45] Date of Patent: Aug. 3, 1999

[54] METHOD OF ADJUSTING VEHICLE WHEEL ALIGNMENT

[75] Inventors: Yutaka Naruse; Kenjiro Yamaya; Hiroshi Nishigata; Kazuo Hayashi, all of Tokyo; Takashi Kaneko; Yutaka Yamaguchi, both of Saitama-ken, all of Japan

[73] Assignee: Bridgestone Corporation, Tokyo, Japan

[21] Appl. No.: 08/882,038

[22] Filed: Jun. 25, 1997

[30] Foreign Application Priority Data

Jun. 25, 1996 [JP] Japan .................................. 8-164876

[51] Int. Cl.⁶ .................................................. B23Q 17/00
[52] U.S. Cl. ...................... 29/407.08; 29/407.09; 33/203.12; 33/203.15
[58] Field of Search ................ 29/404, 407.05, 29/407.08, 407.09, 802; 33/203.12, 203.13, 203.14, 203.15, 288; 356/139.09, 155; 364/528.14

[56] References Cited

U.S. PATENT DOCUMENTS

| | | | |
|---|---|---|---|
| 3,473,374 | 10/1969 | Leeper | 73/124 |
| 3,579,845 | 5/1971 | Hunter et al. | 33/203.13 |
| 4,679,327 | 7/1987 | Fouchey et al. | 33/203.13 |
| 4,856,199 | 8/1989 | Merrill et al. | 33/203.17 |
| 4,899,218 | 2/1990 | Waldecker et al. | 358/93 |
| 5,111,585 | 5/1992 | Kawashima et al. | 33/203.12 |
| 5,150,515 | 9/1992 | Merrill et al. | 33/203.12 |
| 5,675,408 | 10/1997 | Samuelsson et al. | 356/155 |

FOREIGN PATENT DOCUMENTS

| 51-18681 | 6/1976 | Japan . |
|---|---|---|
| 7-5076 | 1/1995 | Japan . |

*Primary Examiner*—David P. Bryant
*Attorney, Agent, or Firm*—Sughrue, Mion, Zinn, Macpeak & Seas, PLLC

[57] ABSTRACT

The present invention provides a method for adjusting vehicle wheel alignment in which a positional angle of a wheel corresponding to the characteristics of a tire can be set easily, running stability suited for an actual road surface can be obtained, and one-sided wear can be reduced. The method for adjusting vehicle wheel alignment includes the steps of: placing a wheel of a vehicle, which is an object of adjustment, on a tire driving surface on which a step of a predetermined height is formed at at least one place along a rotating direction in which the tire driving surface is driven by a rotational force; measuring variations in forces applied in the rotating direction of the tire driving surface and a rotation axis direction which is orthogonal to the rotating direction at the time the wheel passes over the step while the tire driving surface is being driven/rotated so that the wheel is rotated in a proceeding direction of the vehicle; and adjusting a positional angle of the wheel, on the basis of results of measurement, such that a variation in lateral force generated by a vehicle tire when the wheel passes over the step is a minimum.

15 Claims, 15 Drawing Sheets

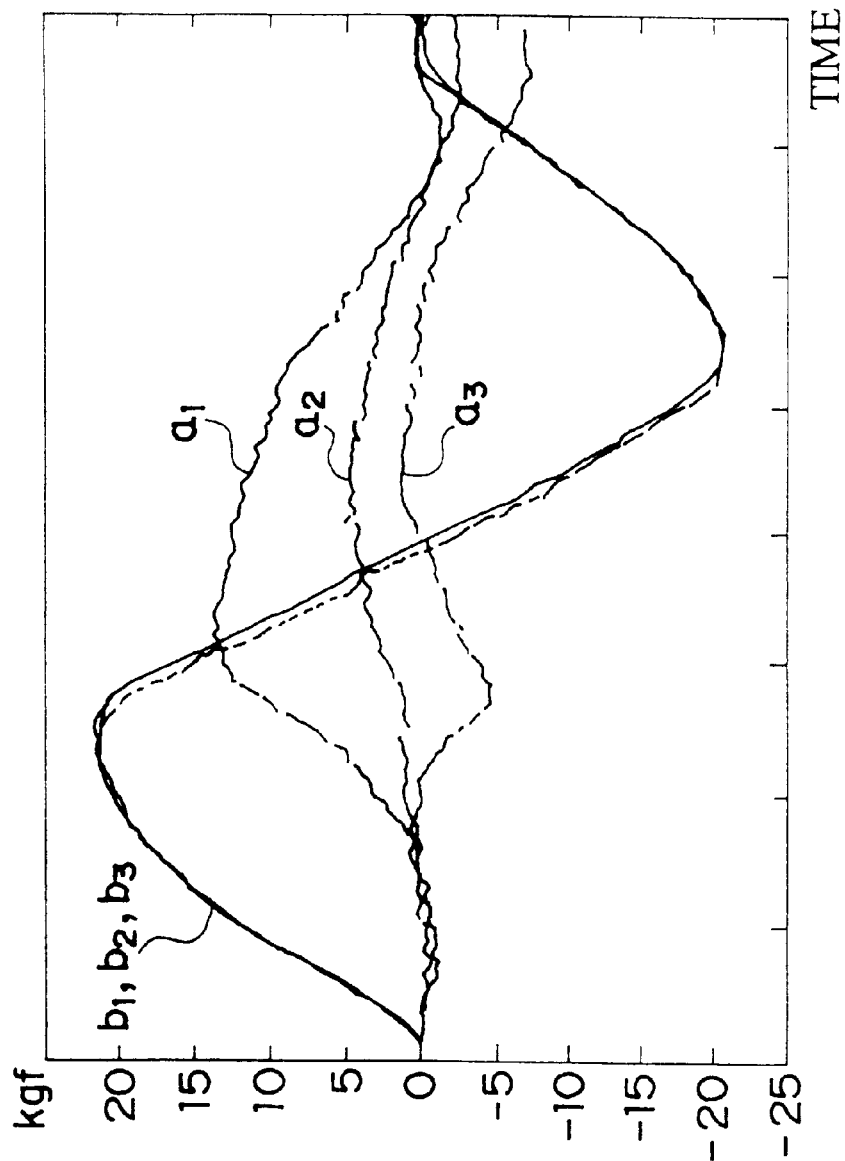

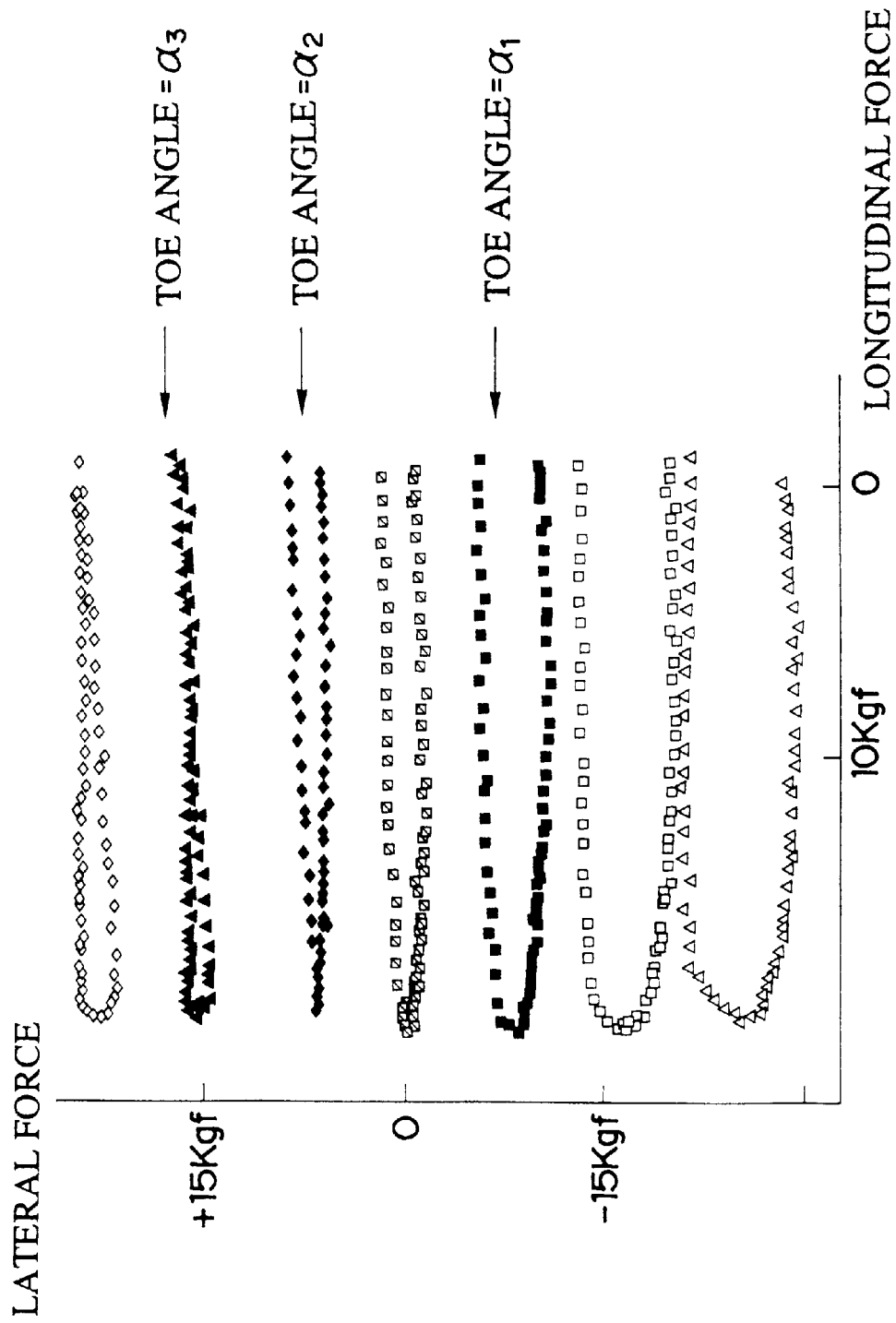

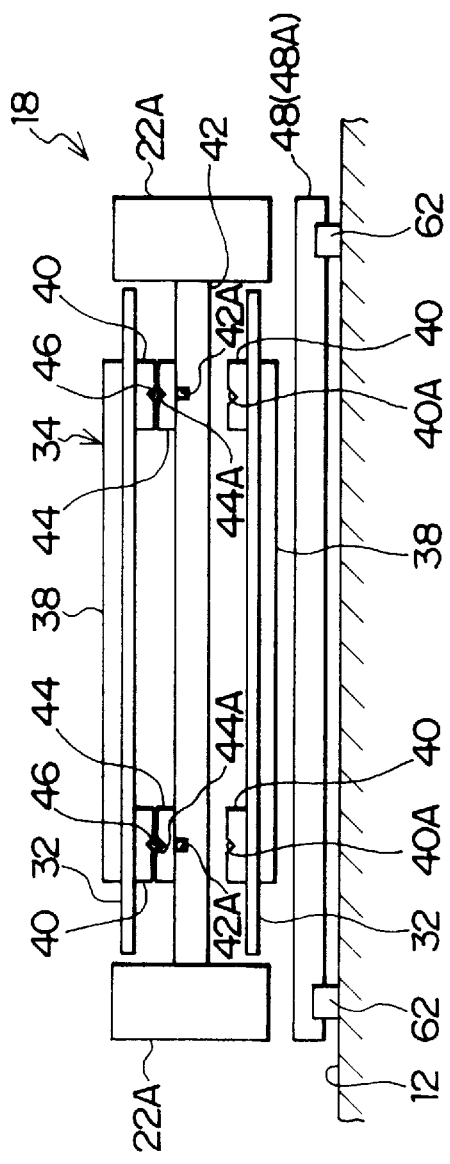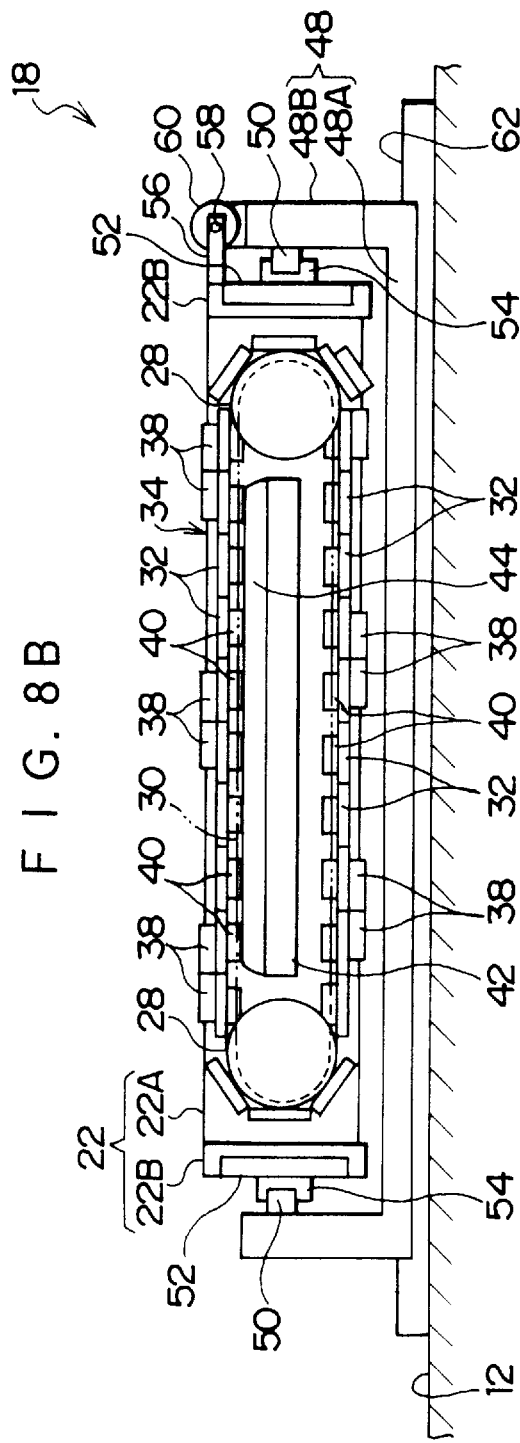

F I G. 1 1
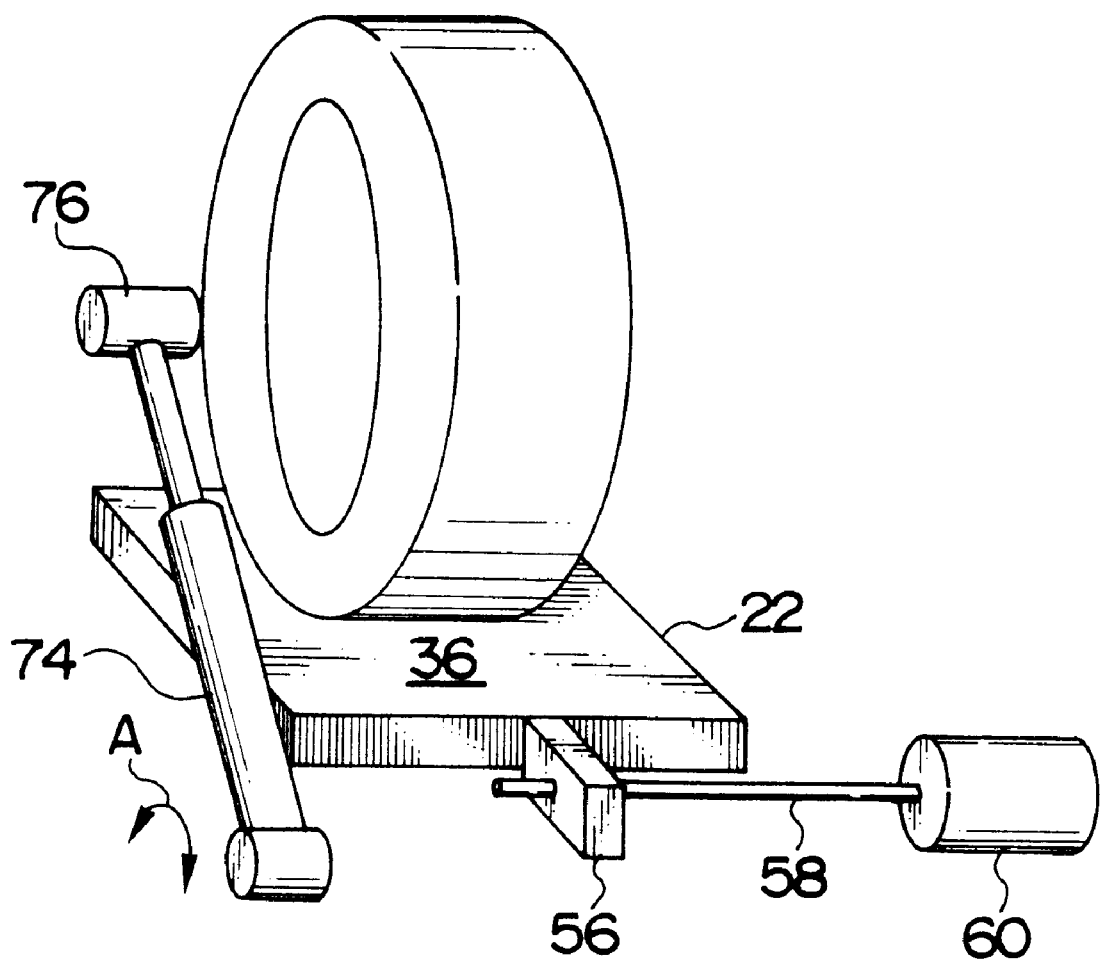

F I G. 1 3
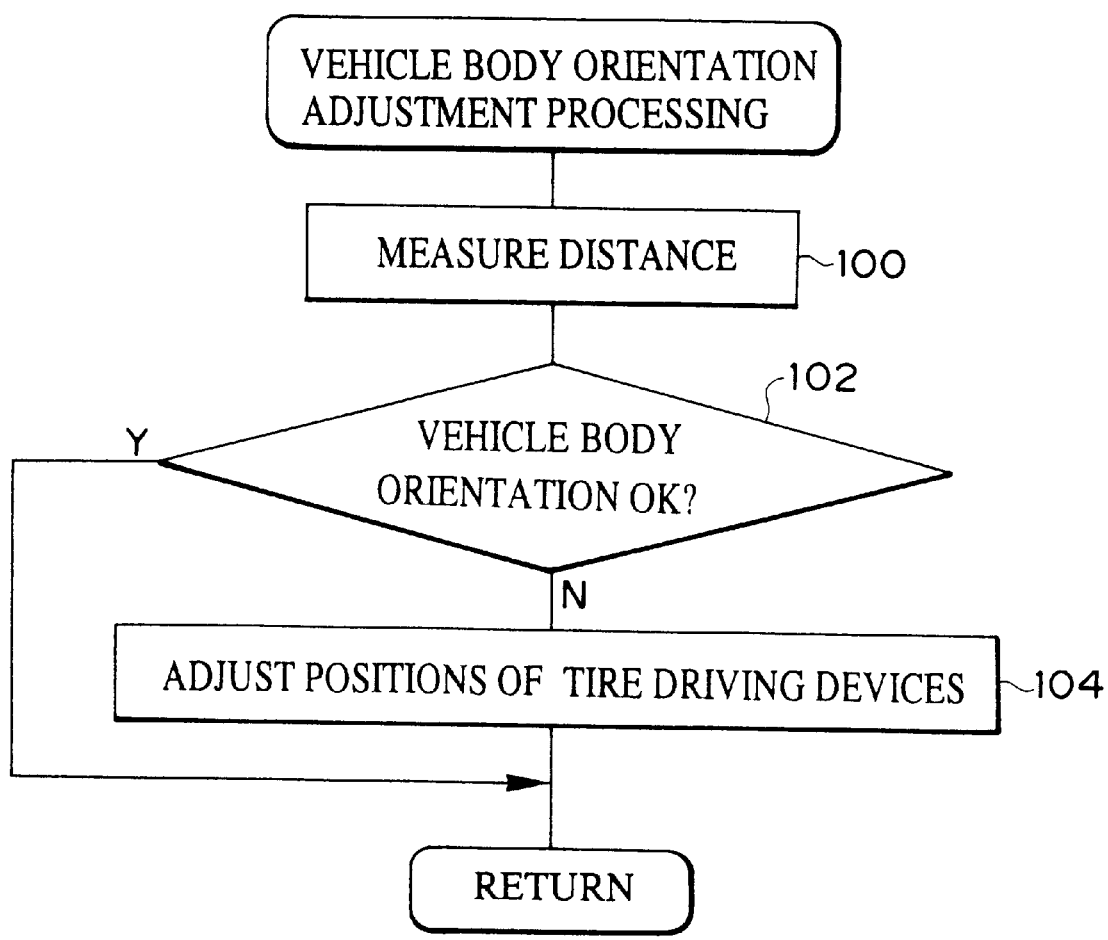

METHOD OF ADJUSTING VEHICLE WHEEL ALIGNMENT

BACKGROUND OF THE INVENTION

1. Field of the Invention

The present invention relates to a method of adjusting vehicle wheel alignment, and in particular, to a method of adjusting vehicle wheel alignment in which forces, which are generated by a tire when a wheel which is placed on a tire driving surface is rotated by driving/rotating the tire driving surface, are measured, and based on the results of measurement, the positional angle is adjusted so as to improve the running stability of the vehicle and decrease one-sided wear of the tire.

2. Description of the Related Art

In general, tires are provided with a camber angle which ensures the running stability of the vehicle, and are provided with a toe angle for preventing one-sided wear caused by the provision of the camber angle. (Note that in the present application, "one-sided wear" refers to a state in which, when the state of wear of a worn tire is observed, it is noted that the amount of wear from one tread shoulder portion to the other tread shoulder portion varies in a taper shape, i.e., uneven wear in which the amount of wear at one tread shoulder portion is greater than the amount of wear at the central portion of the tread and at the other tread shoulder portion.

Conversely, the tire may be provided with a toe angle which balances the forces generated at the front tires and the rear tires of the vehicle so as to ensure the running stability of the vehicle, and may be provided with a camber angle for preventing one-sided wear caused by the toe angle. Alternatively, the toe angle and the camber angle may both be adjusted in combination in order to optimize the running stability of the vehicle and minimize one-sided wear of the tire in light of limitations of the vehicle such as the structural dimensions and the like.

Accordingly, in order to improve the running stability and the one-sided wear resistance of the tire in a vehicle running state, it is important to adjust the camber angle and the toe angle, which are the positional angles, of each wheel. In conventional methods for adjusting the toe angle and the camber angle, usually, angles and dimensions are measured for each wheel, and the toe angle and the camber angle are adjusted so that the measured angles and dimensions become target values set at the time the vehicle is designed.

Tires have various characteristics such as ply steer which is generated by the internal structure of the tire; toe force which is generated due to the tire having an angle with respect to the proceeding direction of the vehicle because the rotating direction of the wheel and the proceeding direction of the vehicle are different; self-aligning torque caused due to the points to which force is applied in the ground-contacting surface being offset from the proceeding direction; camber thrust generated by the tire deforming due to the camber angle of the wheel, and generated by its relation with the rigidity of the tire due to the internal structure of the tire; camber moment caused by the difference in the length of the ground contacting surface at the left and right sides of the tire; conicity resulting from manufacturing errors in the configuration which are inherent in industrial goods; rolling resistance which depends on the internal structure and the material from which the tire is formed such as rubber; and the like. These characteristics depend on and vary in accordance with the load which is applied to the wheel. Further, these characteristics also vary in accordance with the type of tire.

The aforementioned forces are generated by the deformation of the tire. The force which is generated by the tire in order to make the vehicle run while controlling its running direction is the sum total of the aforementioned forces. Therefore, regardless of the type of tire, the force thus generated in order to make the vehicle run differs in accordance with the load distribution of the vehicle to which the tire is mounted and the positional angle of the wheel to which the tire is mounted. Accordingly, in order to respond to the demands for vehicles' improved ability to travel at higher speeds and the demands for good straight line stability, a method of adjusting the positional angle which results in better running stability and better one-sided wear resistance is needed. However, in order to realize such a method, a method for adjusting the positional angle which is based on the characteristics of the tire must be provided.

The following art is known as a conventional method for adjusting the positional angle which focuses on the characteristics of the tire. A wheel is driven by using a plurality of rollers. The respective forces generated by the rollers are measured, and the toe angle and the camber angle are measured on the basis of the orientations and magnitudes of the measured forces. (Refer to Japanese Patent Application Publication JP-B No. 51-18681.) However, it has been confirmed that the force generated at the time of contact of the tire and the road surface differs in accordance with the configuration of the contact between the tire and the road surface. Because the configuration of the contact between the tire and the rollers differs greatly from the configuration of the contact between the tire and an actual road surface, the characteristics of the generated force also differ greatly on the rollers and on a road surface.

More specifically, the force generated at the time the tire is run on rollers is similar to the force generated at the time the tire is run on an actual road surface with respect to the lateral force caused by the ply steer and the provision of the toe angle. However, the positional angle and the magnitude of the force differ greatly from those in the case in which the tire is run on an actual road surface. Further, the camber thrust can barely be detected. Moreover, the force generated by the tire cannot be detected due to the deformation of the tire caused by the external disturbance resulting from the countless protrusions and recesses existing on an actual road surface.

In the above-described conventional art, the measured force exhibits values which are different than values obtained on an actual road surface. In order to correct the measured values to the values obtained on an actual road surface, data expressing the characteristics of the respective tires on an actual road surface is needed. Therefore, the above-described conventional method lacks wide applicability in actual practice. Further, no technical information has been disclosed with regard to what angle the positional angle should be adjusted to in order to optimize the positional angle.

Further, a technique is known which aims to achieve high running stability by driving a wheel by using a plurality of rollers and bringing the generated lateral force to substantially zero. (Refer to Japanese Patent Application JP-A Laid-Open No. 7-5076.) In this art, when the generated lateral force is to be made zero, a wheel provided with a camber angle is provided with a positional angle which results in the generation of a force in the direction opposite to the direction of the camber thrust.

In this art, the camber thrust can barely be detected because, in the same way as in the previously-described case, the contact surface of the rollers and the tire is different than the contact surface of an actual road surface and the tire. Further, in order to bring the lateral force to zero, the force from the road surface generated by the traveling of the vehicle must be applied in the direction opposite to the direction of the force generated by the wheel, so as to offset the force generated by the rotation of the wheel. In this case, the deformation of the ground-contacting surface of the tire becomes even larger than when the tire is in a stationary state, and this deformation of the ground-contacting surface is a factor in the generation of one-sided wear of the tire.

The inventors of the present invention have filed with the Japanese Patent Office an application JP-A No. 7-139506 related to the present invention, which is still pending and not yet publicly known. The related art proposes a method of adjusting the positional angle of a wheel by rotating the tire on a substantially planar surface by using a belt or the like, detecting the force generated by the wheel, and adjusting the positional angle of the wheel on the basis of the force. However, an actual road surface is formed by countless protrusions and recesses, and during travel, the tire always is deformed and affected by the force generated by contact with the road surface and the force caused by the deformation. The force which can be detected when the wheel is run on a substantially planar surface formed by a belt or the like is only the former force, and therefore, only a portion of the force generated during travel on an actual road surface can be detected. Accordingly, adjusting the positional angle of the wheel on the basis of the force detected when the wheel is run on a substantially planar surface contributes to improving the running stability when the vehicle runs straight on a road surface which is extremely planar, but does not address the other running characteristics nor one-sided wear.

More specifically, when a tire runs on an actual road surface, various forces which are generated in different ways are generated. Although these forces differ in accordance with the characteristics of the tire, the following conventional methods, have been used: (1) a vehicle using specific tires is actually run, the angle at which there is little one-sided wear and running stability does not deteriorate is measured empirically, and the wheel is adjusted to this angle; (2) the force measured with the tire running on a planar surface is offset so as to be adjusted to a minimum value (substantially zero); (3) only a specific force measured with the tire running on a planar surface or on rollers is made to become a minimum value (substantially zero); (4) the angle is adjusted to a value obtained by some method. However, a method which can be used with various vehicles and various tires has heretofore not been realized.

SUMMARY OF THE INVENTION

The present invention was achieved in consideration of the aforementioned, and an object thereof is to provide a method for adjusting vehicle wheel alignment in which a positional angle of a wheel corresponding to the characteristics of a tire can be set easily, running stability suited for an actual road surface can be obtained, and one-sided wear can be reduced.

When a tire is rotated while contacting a road surface having protrusions and recesses, the ground-contacting surface is deformed by the variations in load occurring due to the ground-contacting surface moving up and down relatively with respect to the tire. Due to this deformation, lateral force known as ply steer which is caused mainly by the structure of the tire, lateral force resulting from the load dependency of a lateral force known as conicity which is generated during the manufacturing process, and lateral force generated due to the wheel being provided with a slip angle (toe angle), all vary. Further, a force (longitudinal force) is generated which pushes a protrusion in the proceeding direction when the tire rides up on the protrusion and which pushes the protrusion in the direction opposite to the proceeding direction when the tire rides down off of the protrusion.

In order to model the behavior of a tire which rotates while contacting a road surface having protrusions and recesses, the inventors of the present invention provided a flat-plate-shaped projection at at least one place on a tire driving surface along the rotating direction in which the driving surface is driven by a rotational force. The length of the projection along the rotating direction is a length which the tire can completely ride up onto. The length of the projection along the direction of the axis of rotation (hereinafter, "rotation axis direction"), which is orthogonal to the rotating direction, is greater than the width of the tire. In this way, a step (difference in levels) is formed at the front and rear of the projection along the rotating direction. The inventors then conducted experiments to measure the variations in the longitudinal force and the lateral force generated by the tire at the time the wheel passed over the place at which the projection was formed, with the positional angle of the wheel being adjusted to various values. The results of experiments in which the toe angle was varied as the positional angle of the wheel are illustrated in FIGS. 1 and 2.

FIG. 1 illustrates the variations in the longitudinal force ($b_1$, $b_2$, $b_3$) and lateral force ($a_1$, $a_2$, $a_3$) when the toe angle was varied to $\alpha_1$, $\alpha_2$, $\alpha_3$. With regard to the variations in lateral force at the respective toe angle values, as can easily be seen by comparing the respective lines illustrating the lateral forces in the graph, at the point in time that the longitudinal forces are generated, the lateral force lines are superposed which indicates that the lateral forces are the same level. In FIG. 1, the portions at which the variations in the longitudinal forces ($b_1$, $b_2$, $b_3$) project upwardly correspond to the tire riding up on the projection, whereas the portions at which the variations in the longitudinal forces ($b_1$, $b_2$, $b_3$) project downwardly correspond to the tire riding down off of the projection. From FIG. 1, it can be understood that even if the toe angle is varied, the way in which the longitudinal force varies is constant, but the way in which the lateral force varies (in particular, the way in which the lateral force varies at the time the tire rides up on the projection) differs in accordance with the toe angle.

FIG. 2 is a distribution pattern graph of the relationship between the longitudinal force and the lateral force at the time the tire rides up on the projection. It is clear from FIG. 2 that the lateral force varies as the variation in the longitudinal force progresses, i.e., as the tire begins to ride up on the projection and the deformation of the tire progresses, and that the way in which the lateral force varies (the width of the variation and the direction of the variation) differs in accordance with the variations in the toe angle. On the basis of the above results, it can be understood that even if there are variations in the longitudinal force due to the tire rotating while contacting a road surface having protrusions and recesses, the variations in the lateral force can be kept small by the value of the toe angle. (In the example of FIG. 2, when the toe angle is $\alpha_2$, the variation in lateral force accompanying the variation in longitudinal force is the smallest. (Note that when the toe angle is $\alpha_3$, the locus of the variation in lateral force crosses itself, and that the width of the variation in lateral force is rather greater than when the toe angle is $\alpha_2$.))

FIGS. 3A and 3B illustrate, for tires of different types and structures, the results of the aforementioned experiments. (FIG. 3A illustrates the experimental results for tire A, and FIG. 3B illustrates the experimental results for tire B.) FIGS. 4A and 4B illustrate the results of the aforementioned experiments wherein vehicles having adjustable camber angles were used, and the camber angles were respectively different. (FIG. 4A illustrates the results of the experiment in which the camber angle was adjusted to −0.2 degrees, and FIG. 4B illustrates the results of the experiment in which the camber angle was adjusted to −2.2 degrees.) The following points are clear from FIGS. 3A, 3B, 4A and 4B. The way in which the lateral force varies differs in accordance with the characteristics of the tire which are determined in accordance with the type of the tire, the structure of the tire and the like, as well as in accordance with the toe angle. Further, the way in which the lateral force varies also differs in accordance with the camber angle as the positional angle of the wheel. Moreover, for toe angle values which allow variations in lateral force to be kept to a minimum, the way in which the lateral force varies differs in accordance with the characteristics of the tire and the camber angle.

For reference in FIGS. 3A, 3B, 4A and 4B, the positions at which it is assumed that a waveform peak is generated at the time when the toe angle of the vehicle is adjusted to an angle which allows the variations in lateral force to be kept to a minimum are indicated by arrows A and B.

The present inventors carried out experiments on plural types of vehicles (vehicles 1 through 5) to compare and evaluate running stability in a case in which the positional angle of the tire was adjusted to an angle which was obtained by the above-described experiment and which allowed the variation in lateral force to be kept to a minimum, and in a case in which the positional angle of the tire was adjusted to an angle determined at the time the vehicle was designed. Vehicles which were either FF or FR driving type and had a displacement of 1200 cc to 3000 cc were used as vehicles 1 through 5. Tires of different types and of the same size as tires mounted to loaded vehicles were used as the tires. The results of the experiments are listed in following Table 1, and the criteria for the setting of the evaluation values are listed in Table 2. In Table 1, the case in which the positional angle of the wheel was adjusted to the angle which was obtained by the experiments and which allowed the variation in lateral force to be kept to a minimum is listed as the "present method".

TABLE 1

| Vehicle Evaluated | | Straight Line Stability (level road) | Straight Line Stability (bumpy road) | Wandering | Cornering Stability | Comfort of Ride on Rough Roads | One-Sided Wear |
|---|---|---|---|---|---|---|---|
| Vehicle 1 | Present Method | 9.0 | 8.0 | 8.0 | 8.0 | 7.0 | 98 |
|  | Standard Method | 8.5 | 7.0 | 6.5 | 6.5 | 6.5 | 80 |
| Vehicle 2 | Present Method | 6.5 | 8.0 | 8.0 | 7.0 | 7.5 | 97 |
|  | Standard Method | 6.0 | 6.5 | 6.5 | 6.5 | 6.5 | 60 |
| Vehicle 3 | Present Method | 8.0 | 8.0 | 7.5 | 8.0 | 5.5 | 95 |
|  | Standard Method | 6.5 | 7.0 | 6.5 | 6.5 | 5.5 | 79 |
| Vehicle 4 | Present Method | 9.0 | 8.5 | 8.5 | 7.5 | 6.5 | 99 |
|  | Standard Method | 8.0 | 7.5 | 8.0 | 7.5 | 6.5 | 85 |
| Vehicle 5 | Present Method | 8.0 | 8.0 | 8.0 | 7.0 | 6.5 | 92 |
|  | Standard Method | 8.0 | 7.0 | 6.0 | 7.0 | 6.5 | 70 |

TABLE 2

CRITERIA FOR SETTING OF EVALUATION VALUES

| Evaluation Level | 6 | barely satisfactory |
| | 7 | somewhat satisfactory |
| | 8 | satisfactory |
| | 9 | very satisfactory |
| Level of Difference in Evaluation Score | ±0.5 | there is somewhat of a difference |
| | ±1.0 | there is a difference |
| | ±2.0 | there is a great difference |
| Evaluation of One-Sided Wear | | one-sided wear ratio = amount of shoulder wear/amount of center wear × 100 (The largest one-sided wear ratio of each wheel is taken, and the average value of the largest one-sided wear ratios of the four wheels of the vehicle is listed in Table 1.) |

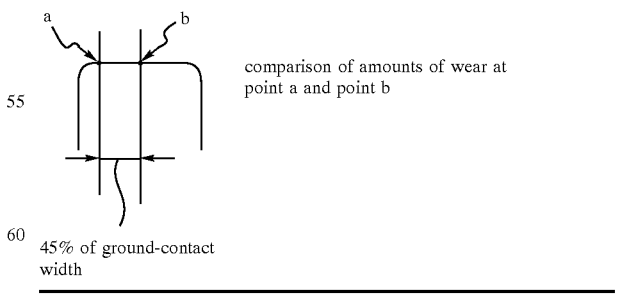

comparison of amounts of wear at point a and point b

45% of ground-contact width

As is clear from Table 1, the above experiments confirmed that, regardless of the type of the tire, the running stability of the vehicle is greatly improved and one-sided wear is greatly reduced by adjusting the positional angle of the wheel such that the variation in lateral force at the time the wheel passes over the projection (more specifically, passes over the step) is small.

By the above-described experiment, the present inventors measured the variations in longitudinal force and lateral force generated by the tire at the time the wheel was rotated while contacting the ground on a tire driving surface on which a step was formed, and on the basis of the results of measurement, the present inventors determined optimal wheel positional angles corresponding to the characteristics of the tire. The present inventors thus discovered that a running stability suited to an actual road surface could be obtained and a reduction in one-sided wear could be realized by adjusting the positional angle of the wheel to the determined optimum positional angle.

On the basis of the above, a first aspect of the present invention is a method of adjusting vehicle wheel alignment in which a vehicle wheel, which is the object of adjustment, is placed on a tire driving surface on which a step of a predetermined height is formed at at least one place along the rotating direction in which the driving surface is driven by a rotational force. When the tire driving surface is driven/rotated so as to rotate the wheel in the proceeding direction of the vehicle, the variations in the forces applied in the rotating direction of the tire driving surface and the rotation axis direction orthogonal to the rotating direction when the wheel passes over the step are measured. On the basis of the results of measurement, the positional angle of the wheel is adjusted so that the variation in lateral force generated by the tire at the time the wheel passes over the step is a minimum.

In the first aspect of the present invention, the vehicle wheel, which is the object of adjustment, is placed on a tire driving surface on which is formed a step of a predetermined height at at least one place along the rotating direction in which the driving surface is driven by a rotational force. When the tire driving surface is driven/rotated such that the wheel is made to rotate in the proceeding direction of the vehicle, the variations in the forces in the rotating direction of the tire driving surface and the rotation axis direction when the wheel passes over the step are measured.

Here, the force which is applied in the rotating direction of the tire driving surface corresponds to the longitudinal force generated by the tire, whereas the force which is applied in the rotation axis direction of the tire driving surface corresponds to the lateral force generated by the tire. Accordingly, on the basis of the results of measurement of the variations in the forces applied in the rotating direction and the rotation axis direction of the tire driving surface, the way in which the longitudinal force and the lateral force, which are generated by the tire at the time the wheel passes over the step, vary can be determined.

In the first aspect of the invention, on the basis of the results of measurement, the positional angle of the wheel is adjusted such that the variation in lateral force generated by the tire at the time the wheel passes over the step is a minimum. Therefore, a wheel positional angle corresponding to the characteristics of the tire can be set easily without running the vehicle on an actual road surface, a running stability suited to an actual road surface can be obtained, and a reduction in one-sided wear can be realized.

A second aspect of the present invention is a method of adjusting vehicle wheel alignment in which vehicle wheels, which are the objects of adjustment, are placed on at least a pair of tire driving surfaces whose rotating directions are parallel and which are disposed so as to be positioned on substantially the same horizontal plane and on each of which a step of a predetermined height is formed at at least one place along the rotating direction in which the driving surface is driven by a rotational force. When the tire driving surfaces are driven/rotated so that the wheels are rotated in the proceeding direction of the vehicle, the variations in the forces applied in the rotating direction of the tire driving surfaces and the rotation axis direction orthogonal to the rotating direction when the wheels pass over the steps are measured for each of the tire driving surfaces. For each of the wheels, the positional angle of the wheel is adjusted on the basis of the way in which the force applied in the rotation axis direction of the corresponding tire driving surface varies within a period of time determined in accordance with the variation in the force applied in the rotating direction of that tire driving surface.

In the second aspect of the present invention, a pair of tire driving surfaces, on each of which a step of a predetermined height is formed at at least one place along the rotating direction in which the driving surface is driven by a rotational force, are disposed so as to be positioned in substantially the same horizontal plane and such that the rotating directions thereof are parallel. The vehicle wheels which are the objects of adjustment are placed on the pair of tire driving surfaces. Next, when the tire driving surfaces are driven/rotated such that the wheels are rotated in the proceeding direction of the vehicle, the variations in the forces applied in the rotating direction and the rotation axis direction of the tire driving surface when the wheels pass over the steps are measured for each tire driving surface of the pair of tire driving surfaces.

The timing at which the wheel passes over the step can be determined on the basis of the variation in force applied in the rotating direction of the tire driving surface. Therefore, in the second aspect, for each of the wheels, the positional angle of the wheel is adjusted on the basis of the way in which the force applied in the rotation axis direction of the corresponding tire driving surface varies during a period of time determined in accordance with the variation in the force applied in the rotating direction of the that tire driving surface. This period of time may be, for example, a period of time in which the force applied in the rotating direction of the tire driving surface becomes a maximum or a value near a maximum. In this way, in the same way as in the first aspect, for each of the vehicle wheels which are an object of adjustment, a wheel positional angle corresponding to the characteristics of the tire can be easily set without running the vehicle on an actual road surface, running stability corresponding to an actual road surface can be obtained, and a reduction in one-sided wear can be realized.

A third aspect of the present invention is a method of adjusting vehicle wheel alignment in which vehicle wheels, which are the objects of adjustment, are placed on at least one pair of tire driving surfaces, whose rotating directions are parallel and which are disposed so as to be positioned on substantially the same horizontal plane and on each of which a step of a predetermined height is formed at at least one place along the rotating direction in which the driving surface is driven by a rotational force. When the tire driving surfaces are driven/rotated so that the wheels are rotated in the proceeding direction of the vehicle, the variations in the forces applied in the rotating direction of the tire driving surfaces and the rotation axis direction orthogonal to the rotating direction when the wheels pass over the steps are measured for each of the tire driving surfaces. For each of the wheels, the positional angle of the wheel is adjusted so that the variation in the force, which is applied in the rotation axis direction of the corresponding tire driving surface at the time that the force applied in the rotating direction of that tire driving surface is a maximum or a value near a maximum, is a minimum.

In the third aspect of the present invention, for each wheel, the positional angle of the wheel is adjusted so that the variation in the force, which is applied in the rotation axis direction of the tire driving surface at the time that the force applied in the rotating direction of that tire driving surface is a maximum or a value near a maximum, is a minimum. Therefore, for each of the vehicle wheels which is an object of adjustment, in the same way as in the first and second aspects, a wheel positional angle corresponding to the tire characteristics can be set easily without running the vehicle on an actual road surface, a running stability suited to an actual road surface can be obtained, and a reduction in one-sided wear can be realized.

In the first through third aspects, the tire driving surface is formed by connecting a plurality of plates which are driven/rotated continuously along the rotating direction. The formation of steps in a case in which the tire driving surface is formed in this way may be realized, for example, as in a fourth aspect of the present invention in which the height, in a direction orthogonal to both the rotating direction and the rotation axis direction, of a portion of the plurality of plates is different from that of the other plates. Or, a projecting portion which projects in a direction orthogonal to both the rotating direction and the rotation axis direction may be provided.

BRIEF DESCRIPTION OF THE DRAWINGS

FIG. 1 is a graph illustrating an example of progress of the variation in longitudinal force and lateral force generated by a tire when a toe angle is varied to various angles and the tire is rotated on a tire driving surface provided with a flat-plate-shaped projection.

FIG. 2 is a graph illustrating an example of the relationship between longitudinal force and lateral force generated by a tire when a toe angle is varied to various angles and the tire is rotated on a tire driving surface provided with a flat-plate-shaped projection.

FIG. 8A is a cross-sectional view taken along line 8A of FIG. 7.

FIG. 8B is a cross-sectional view taken along line 8B of FIG. 7.

FIG. 11 is a schematic view illustrating a distance sensor and a position adjusting mechanism of the tire driving device.

FIG. 13 is a flowchart illustrating vehicle orientation adjustment processing.

DESCRIPTION OF THE PREFERRED EMBODIMENTS

Figure 3B:
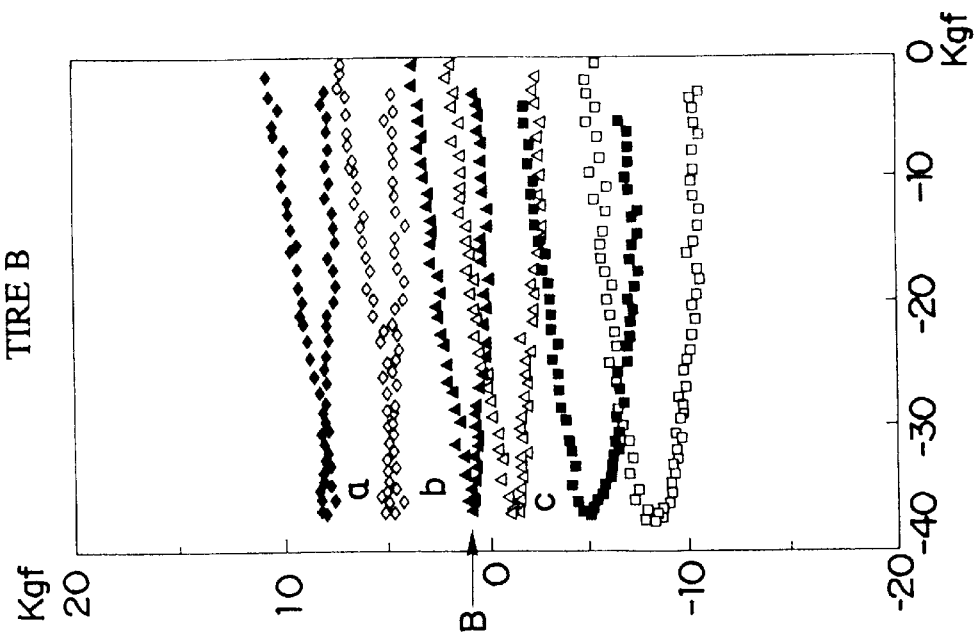
FIGS. 3A and 3B are graphs illustrating examples of the relationship between longitudinal force and lateral force generated by tires when different types of tires are used, a toe angle is varied to various angles, and the tires are each rotated on a tire driving surface provided with a flat-plate-shaped projection.
Figure 3A:
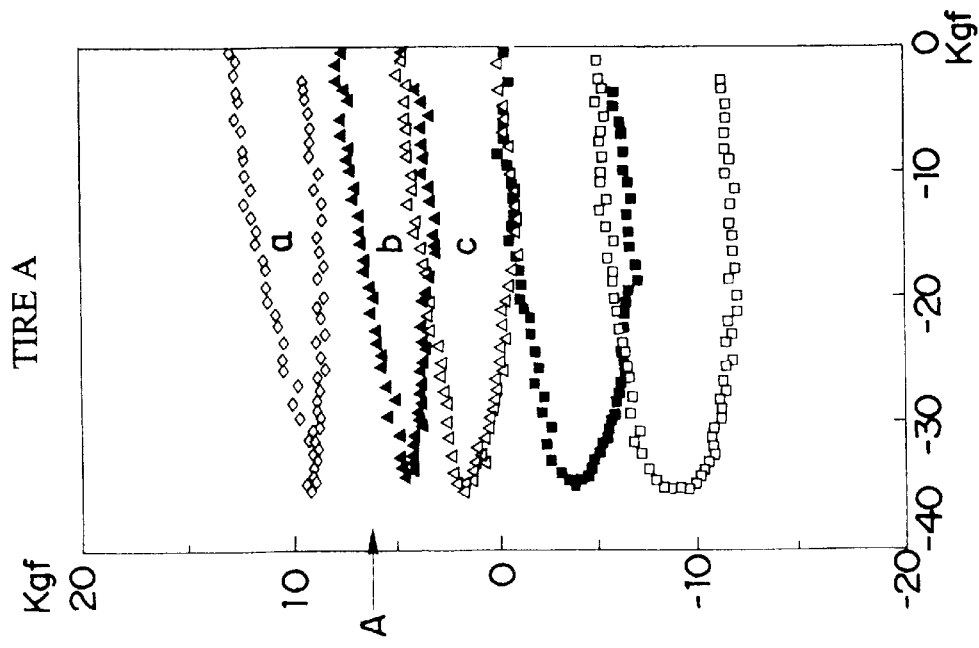
Figure 4A:
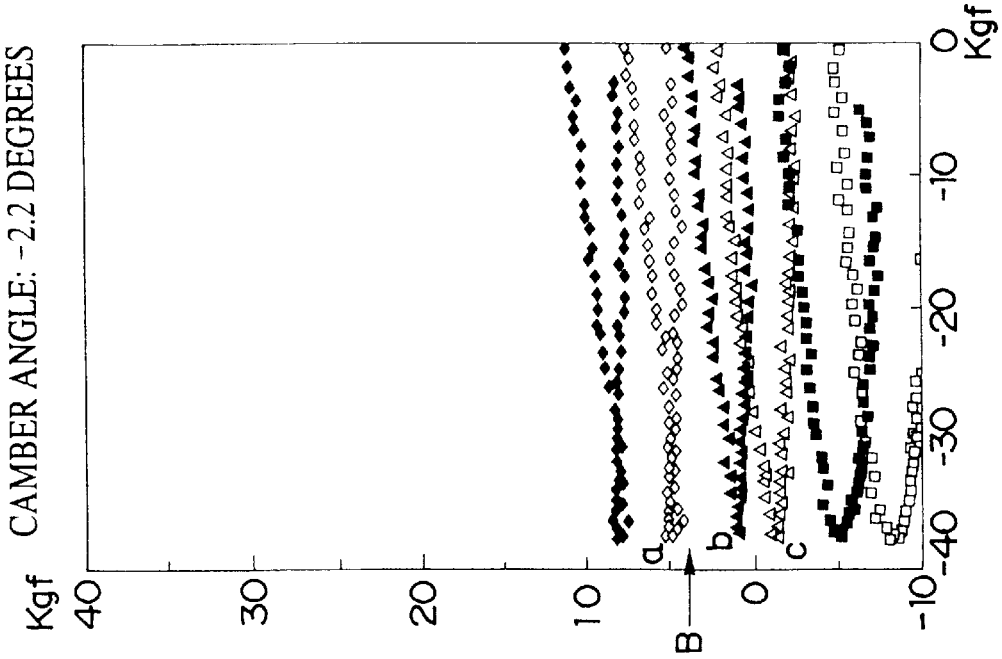
FIGS. 4A and 4B are graphs illustrating examples of the relationship between longitudinal force and lateral force generated by tires when different camber angles are used, a toe angle is varied to various angles, and the tires are each rotated on a tire driving surface provided with a flat-plate-shaped projection.
Figure 4B:
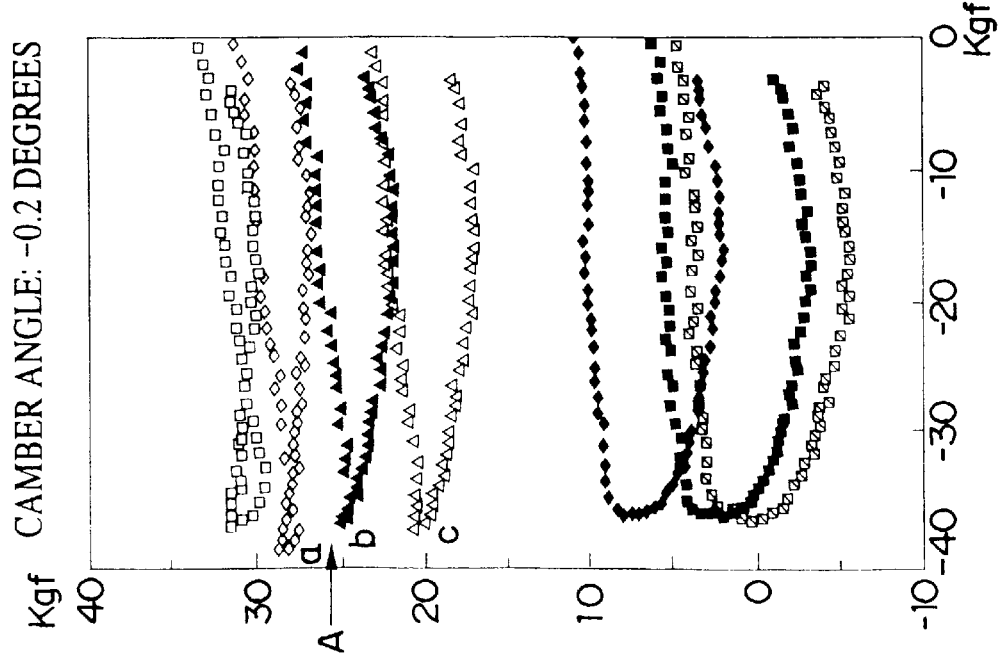
Figure 5:
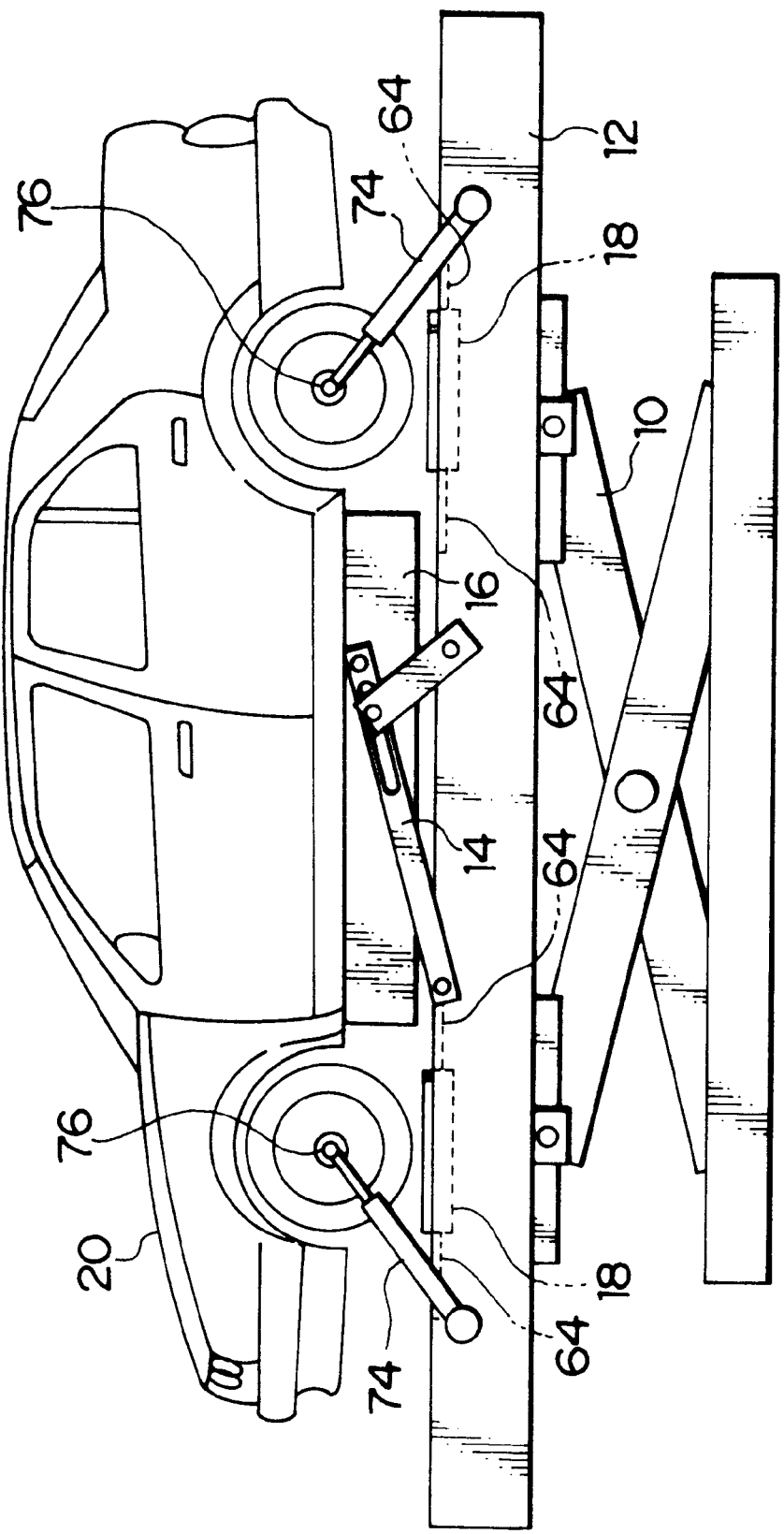
FIG. 5 is a side view of a device for measuring wheel alignment relating to an embodiment of the present invention.
Figure 6:
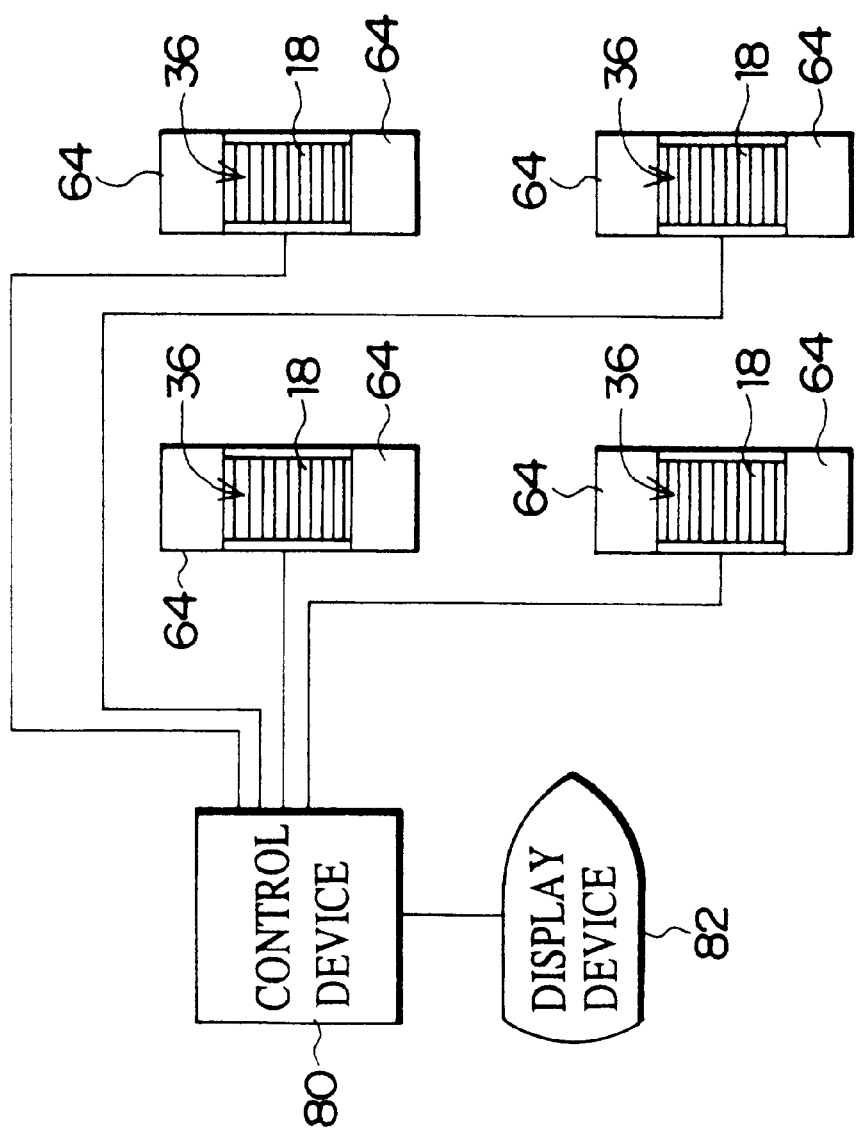
FIG. 6 is a schematic plan view of the device for measuring wheel alignment.

Examples of embodiments of the present invention will be described hereinafter with reference to the figures. A device for measuring wheel alignment to which the present invention may be applied is illustrated in FIGS. 5 and 6.

The device for measuring wheel alignment includes a stand 12 which is raised and lowered by a main raising/lowering device 10, and a vehicle receiving stand 16, which is raised and lowered by a secondary raising/lowering device 14 with respect to the stand 12. Four tire driving devices 18 for driving/rotating the wheels of a vehicle 20 are mounted to the stand 12. The four tire driving devices 18 have the same structures, and therefore, only one tire driving device 18 will be described hereinafter.

Figure 7:
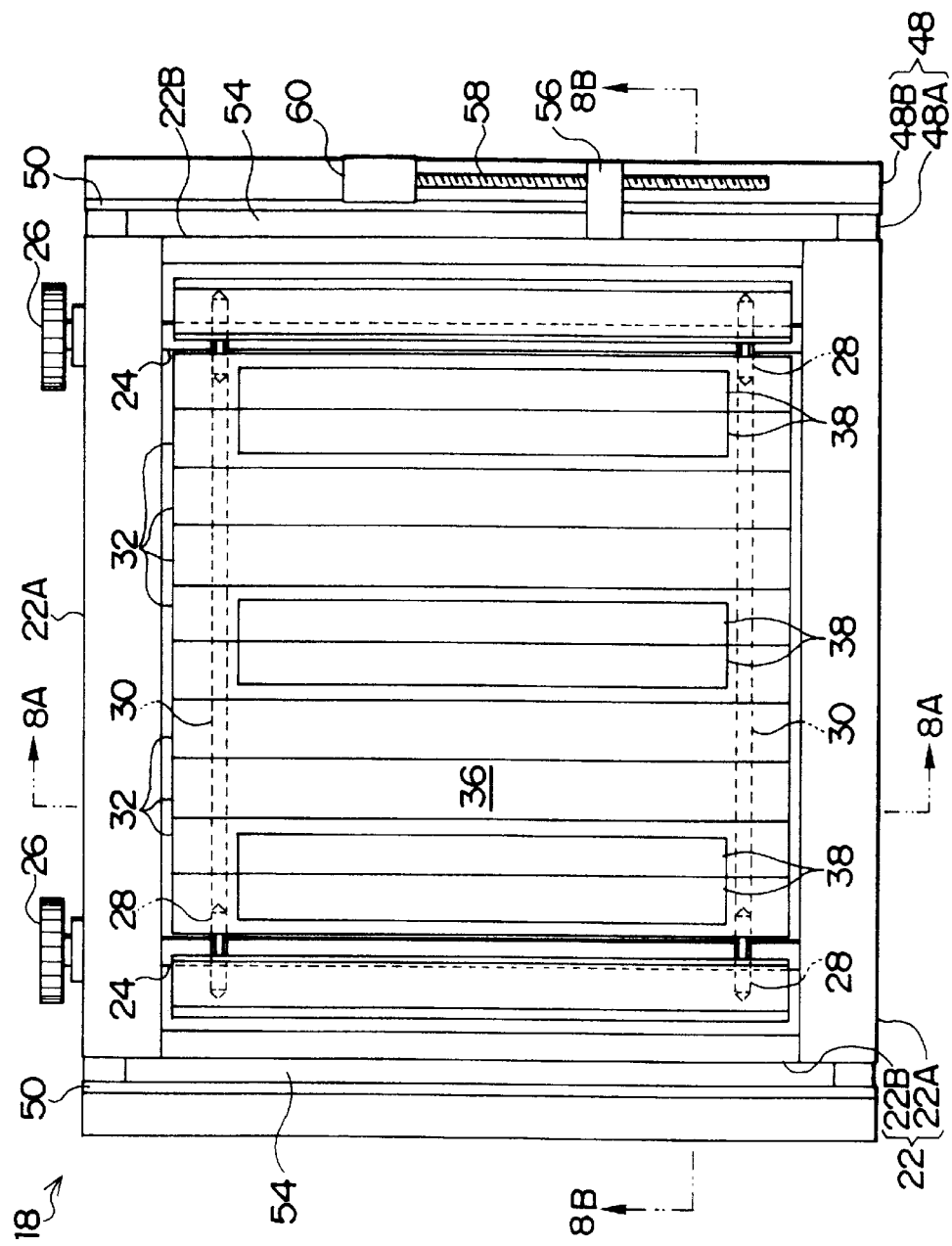
FIG. 7 is a plan view of a tire driving device.

As illustrated in FIG. 7, the tire driving device 18 is provided with a frame 22 which is formed by a pair of main frames 22A which are disposed parallel to one another and spaced apart by a predetermined interval, and side plates 22B which bridge the end portions of the pair of main frames 22A. The frame 22 is disposed such that the longitudinal direction of the main frames 22A runs along the longitudinal direction of the vehicle 20. A pair of drive shafts 24 bridge the pair of main frames 22A at positions corresponding to the vicinities of the side plates 22B. The pair of drive shafts 24 are rotatably supported by the main frames 22A.

A gear 26 is provided at one end of each of the drive shafts 24. The gears 26 are, via an unillustrated drive force transmission mechanism, connected to the rotating shaft of a motor (not shown) whose driving is controlled by a control device 80 (see FIG. 6). Accordingly, when the motor is driven, the driving force generated by the motor is, via the drive force transmission mechanism and the gears 26, transmitted to the drive shafts 24 such that the pair of drive shafts 24 are rotated.

Two sprockets 28 are mounted to each drive shaft 24 at positions of opposing the two sprockets 28 mounted to the other drive shaft 24. Two endless chains 30 bridge the pair of drive shafts 24. Each of the two endless chains 30 is entrained about an opposing pair of the sprockets 28 (see FIG. 8B). In this way, when the rotating shafts 24 rotate, the two chains 30 are rotated via the sprockets 28.

The tire driving device 18 is provided with a plurality of long, thin aluminum plates 32 of a length which sufficiently exceeds the width of the tire, and of a width which is of an extent such that the plates 32 do not enter into the grooves of the tread pattern of the tire. The plural plates 32 are disposed continuously along the longitudinal direction of the chains 30, and are parallel to the side plates 22B. The end portions of the plates 32 are mounted to two chains 30 via unillustrated connecting members.

Accordingly, as illustrated in FIGS. 7 and 8B, a plurality of the plates 32 are connected by the chains 30 and the connecting members along the widthwise direction of the plates 32 so as to form an endless locus 34. The endless locus 34 bridges the pair of drive shafts 24 such that the longitudinal direction of the plates 32 corresponds to the transverse direction of the vehicle. Because the pair of drive shafts 24 are supported by the frame 22, the endless locus 34 is supported by the frame 22 so as to be able to be driven/rotated. Hereinafter, the surface formed by the top surfaces of the plurality of plates 32 when the tire driving device 18 is viewed from above is called tire driving surface 36.

As illustrated in FIGS. 8A and 8B, a plurality of flat-plate-shaped projections 38 of a predetermined height are formed on the outer surface of the endless locus 34 at predetermined intervals along the rotating direction of the endless locus 34. Each projection 38 is formed so as to continue over two plates 32 adjacent in the rotating direction of the endless locus 34, on the top surfaces of the two plates 32 which top surfaces correspond to the outer side of the endless locus 34. The length of each projection 38 along the widthwise direction of the endless locus 34 (i.e., along the rotation axis direction) is longer than the width of the tire. The edges at the respective longitudinal sides of the projection of the endless locus 34 correspond to the steps of the present invention.

Accordingly, when the endless locus 34 is driven/rotated with a wheel of the vehicle 20 placed on the tire driving surface 36, the tire is made to rotate on the tire driving surface 36 and repeats passing over a step from the top surfaces of plates 32 so as to ride up onto the top surface of the projection 38 and then passing over a step from the top surface of the projection 38 so as to ride down onto the top surfaces of plates 32.

As illustrated in FIG. 8A, a plate guide 40 is mounted to each side portion of each plate 32 on the surface corresponding to the inner side of the endless locus 34. A V-shaped engagement groove 40A is formed in the plate guide 40 along the rotating direction of the endless locus 34. The end portions of a load receiving plate member 42, which is disposed so as to bridge the pair of main frames 22A, are fixed to inner side surfaces of the pair of main frames 22A. Guide members 44 are fixed to the top surface of the load receiving plate member 42 at positions opposing the plate guides 40.

V-shaped receiving grooves 44A are formed along the rotating direction of the endless locus 34 in the top surfaces of the guide members 44 at positions opposing the engagement grooves 40A. A plurality of balls 46 formed of steel and of the same size are disposed between the engagement grooves 40A and the receiving grooves 44A.

Accordingly, even if a wheel of the vehicle 20 is placed on the tire driving surface and load is applied to the plates 32 forming the endless locus 34, the plurality of plates 32 which form the tire driving surface 36 are supported via the balls 46 by the guide members 44 and the load receiving plate member 42 such that the top surfaces of the plates 32 are coplanar. By driving the endless locus 34 so that the wheel rotates as will be described later, when the rotation axis direction force of the endless locus 34 is applied to the tire driving surface, this force is transmitted to the frame 22 via the plate guides 40, the balls 46, the guide members 44 and the load receiving plate member 42.

Rectangular grooves 42A, which are of a size which allows the balls 46 to pass therethrough, are formed along the rotating direction of the endless locus 34 at the portions of the load receiving plate member 42 covered by the guide members 44. Although omitted from the drawings, a U-shaped groove, which connects in a U-shape the path between the engagement groove 40A and the receiving groove 44A and the path formed by the rectangular groove 42A, is formed in the each end portion of the load receiving plate member 42. The balls 46 are circulated via the U-shaped groove between the path formed by the rectangular groove 42A and the path between the engagement groove 40A and the receiving groove 44A.

A support frame 48 is disposed at the outer side of the frame 22. The support frame 48 is formed in a substantially U-shaped configuration by a bottom portion 48A which is disposed beneath the frame 22 and extends along the rotating direction of the endless locus 34, and a pair of supporting portions 48B which stand upright at the end portions of the bottom portion 48A such that the side surfaces of the supporting portions 48B oppose the side plates 22B of the frame 22 with predetermined intervals therebetween. Guide rails 50 for transverse direction sliding, which extend along the rotation axis direction of the endless locus 34 (i.e., the transverse direction of the vehicle), are mounted to the side surfaces of the pair of supporting portions 48B.

Moving blocks 54 are mounted to the side plates 22B of the frame 22 via force sensors 52 (which will be described in detail later). Grooves in which the guide rails 50 for transverse sliding are fit are formed in the side surfaces of the moving blocks 54, and the moving blocks 54 are fit via these grooves with the guide rails 50 for transverse sliding. Accordingly, the frame 22 (and the endless locus 34) can be moved along the transverse direction of the vehicle along the guide rails 50 for transverse sliding.

A bracket 56 is mounted to one of the side plates 22B so as to project toward one of the supporting portions 48B of the support frame 48. A female screw hole which passes through the distal end portion of the bracket 56 is formed along the transverse direction of the vehicle. A rotating shaft 58, in which a male screw is formed, is screwed with the female screw hole so as to form a ball screw mechanism. One end of the rotating shaft 58 is connected coaxially to the rotating shaft of a motor 60 which is mounted to the supporting portion 48B of the support frame 48. The motor 60 is connected to a control device 80 (see FIG. 6). (The connection of the motor 60 to the control device 80 is not shown.) The driving of the motor 60 is controlled by the control device 80.

In this way, when the motor 60 is driven and the rotating shaft 58 rotates, the bracket 56, the frame 22, the endless locus 34 and the like are moved integrally in the transverse direction of the vehicle with respect to the support frame 48. Further, in the state in which the rotation of the motor 60 is stopped, due to the operation of the ball screw mechanism, movement of the frame 22 and the like in the transverse direction of the vehicle with respect to the support frame 48 is prevented.

Figure 9B:
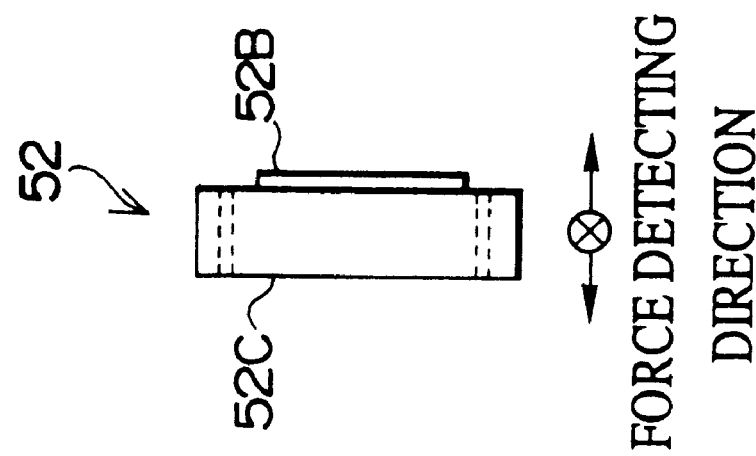
FIG. 9B is a side view of the force sensor.
Figure 9A:
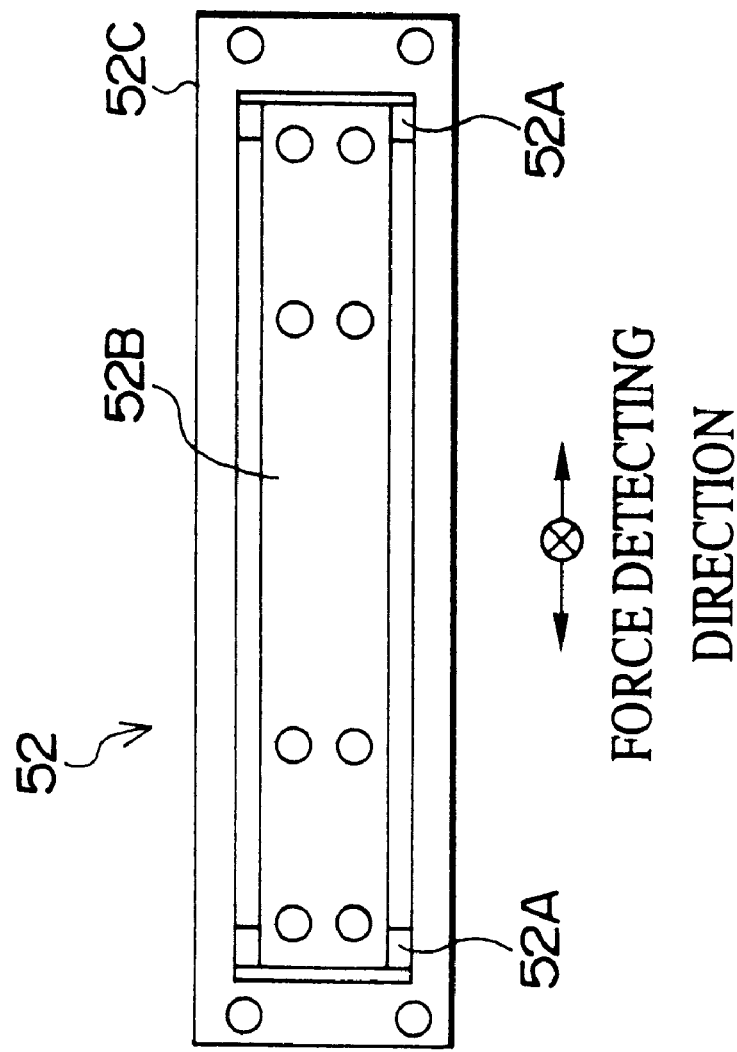
FIG. 9A is a front view of a force sensor.

As illustrated in FIGS. 9A and 9B, the force sensor 52 is provided with a pair of beams 52A for measuring force which include force detecting elements such as strain gauges, load cells or the like. Both end portions of the beams 52A for measuring force are fixed to the inner portion of a rectangular frame 52C, and the intermediate portions of the beams 52A for measuring force are connected together by a connecting plate 52B. The force sensor 52 can detect forces in two directions orthogonal to the longitudinal direction of the beams 52A for measuring force (i.e., in the direction orthogonal to the plane of the paper of FIG. 9A and in the direction orthogonal to the plane of the paper of FIG. 9B).

Four screw holes for mounting to the side plate 22B are formed in the rectangular frame 52C. Eight screw holes for mounting to the moving block 54 are formed in the connecting plate 52B. The force sensors 52 are fixed to the side plates 22B and to the side surfaces of the moving blocks 54 by screws such that the longitudinal direction of the beams 52A for measuring force is the vertical direction of the vehicle.

Accordingly, when the endless locus 34 is driven/rotated and the rotating direction force is applied to the endless locus 34 by the wheel rotating on the endless locus 34, the force is transmitted to the frame 22 via the sprockets 28, and the side plates 22B of the frame 22 move in the rotating direction. In this way, the beams 52A of the force sensors 52 are deformed in the rotating direction, and the magnitude of the rotating direction force is measured by the force sensors 52.

When rotation axis direction force is applied to the endless locus 34 by the wheel rotating on the endless locus 34, this force is transmitted to the frame 22 via the plate guides 40, the balls 46, the guide members 44, and the load receiving plate member 42, and the side plates 22B of the frame 22 move in the rotation axis direction. In this way, the beams 52A of the force sensors 52 deform in the rotation axis direction, and the magnitude of the force in the rotation axis direction is measured by the force sensors 52. The force sensors 52 are connected to the control device 80 (see FIG. 6), and output the results of measurement to the control device 80.

A pair of guide rails 62 for longitudinal sliding, which are mounted to the stand 12 and extend parallel to one another along the rotating direction of the endless locus 34 (i.e., along the longitudinal direction of the vehicle), are disposed beneath the bottom plate 48A of the support frame 48. A pair of grooves, with which the guide rails 62 for longitudinal sliding are fit, are formed in the bottom surface of the bottom portion 48A. The guide rails 62 for longitudinal sliding are fit with the bottom portion 48A via these grooves. Accordingly, the support frame 48 is movable in the longitudinal direction of the vehicle along the guide rails 62 for longitudinal sliding.

Although not illustrated in the drawings, the support frame 48 is moved in the longitudinal direction of the vehicle with respect to the stand 12 by the same type of driving mechanism as that described above (a ball screw mechanism and motor).

The rotating directions of the endless loci 34 of the pair of tire driving devices 18 on which the front wheels of the vehicle 20 are placed are parallel. The rotating directions of the endless loci 34 of the pair of tire driving devices on which the rear wheels of the vehicle 20 are placed are also parallel. The rotating directions of the endless loci 34 of the tire driving devices 18 on which the front wheels are placed and the tire driving devices 18 on which the rear wheels are placed are the same directions.

Figure 10:
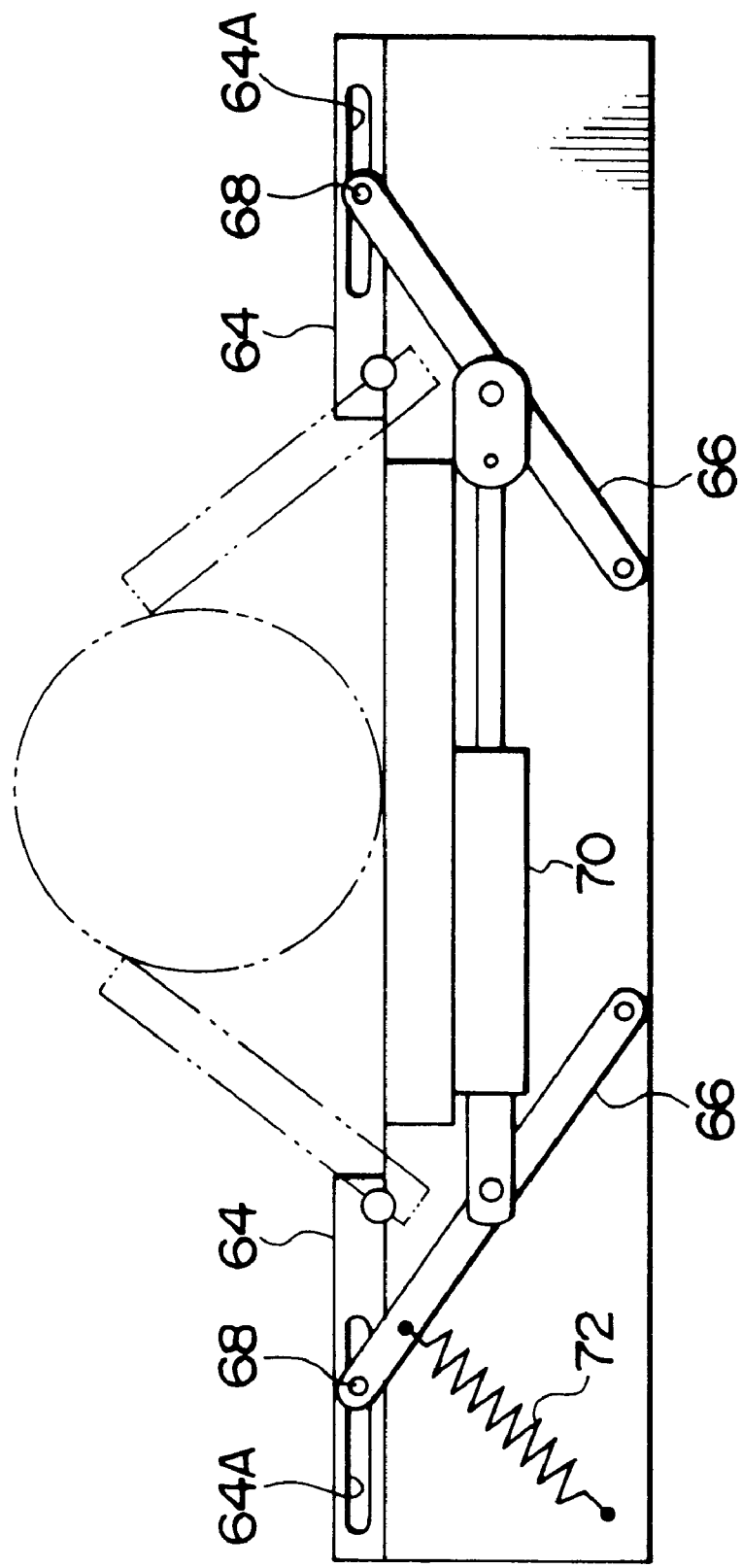
FIG. 10 is a schematic structural view of a wheel stop plate driving mechanism.

As illustrated in FIG. 5, a pair of vehicle stopping plates 64 are disposed at the tire driving device 18, i.e., one vehicle stopping plate 64 at the vehicle longitudinal direction front side of the tire driving device 18 and one vehicle stopping plate 64 at the vehicle longitudinal direction rear side of the tire driving device 18. The driving mechanism illustrated in FIG. 10 is provided so as to correspond to the pair of vehicle stopping plates 64. In their accommodated state (the state illustrated by the solid lines in FIG. 10), the pair of vehicle stopping plates 64 are substantially flush with the upper surface of the stand 12. The end portions of the vehicle stopping plates 64 at the sides near the tire driving device 18 along the longitudinal direction of the vehicle are rotatably supported at the stand 12.

A pair of levers 66 are provided in correspondence with the pair of wheel stopping plates 64. An elongated hole 64A is formed in the side surface of the wheel stopping plate 64 at the intermediate portion thereof along the vehicle longitudinal direction. The upper end portion of the corresponding lever 66 is fit with play into the elongated hole 64A by a pin 68. The respective lower end portions of the pair of levers 66 are rotatably supported at the stand 12 such that, when the wheel stopping plates 64 are in their accommodated states, the distance between the lower end portions of the pair of levers 66 decreases along the directions in which the levers 66 are inclined downward.

The intermediate portions of the pair of levers 66 are connected together by a hydraulic cylinder 70. One end of a tension coil spring 72 is connected to the intermediate portion of one of the levers 66, whereas the other end of the tension coil spring 72 is attached to the stand 12.

The hydraulic cylinder 70 is connected to the control device 80 (see FIG. 6). The extension and contraction of the hydraulic cylinder 70 is controlled by the control device 80. When the length of the hydraulic cylinder 70 gradually becomes shorter than the length illustrated in FIG. 10 due to the control device 80, the pair of levers 66 gradually approach upright states against the urging force of the tension coil spring 72, and the distance between the upper end portions of the levers 66 gradually becomes shorter. Accordingly, the pair of wheel stopping plates 64 pivot. In a case in which a wheel is disposed on the tire driving device 18, due to the distal end portions of the pair of wheel stopping plates 64 contacting the wheel as illustrated by the imaginary lines in FIG. 10, rotation of the wheel in the longitudinal direction of the vehicle is prevented.

Rods 74 are mounted to four places at the side portions of the stand 12 in correspondence with the four tire driving devices 18. As illustrated in FIG. 11, the rod 74 is supported so as to be freely rotatable along the directions of arrow A in FIG. 11, and can freely extend and contract. A distance sensor 76 is mounted to the distal end portion of the rod 74. The distance sensor 76 may be, for example, a non-contact type sensor which emits laser light toward an object and detects the distance to the object by receiving the laser light which is reflected by the object.

In the state in which a wheel is placed on the tire driving device 18, the rod 74 is rotated and extended or contracted manually such that the distance sensor 76 opposes the center of the wheel. In this way, the distance sensor 76 can detect the distance to the wheel placed on the tire driving device 18. The distance sensor 76 is connected to the control device 80 (see FIG. 6), and outputs to the control device 80 the results of detection of the distance to the wheel.

The control device 80 illustrated in FIG. 6 is formed, for example, by a microcomputer. A display device 82, which is formed by a CRT or the like for displaying the values measured by the force sensors 52, the directions of adjustment of the positional angles of the wheels, and the like, is connected to the control device 80.

A method of adjusting wheel alignment using the above-described wheel alignment measuring device will be described hereinafter as operation of the present embodiment.

First, in accordance with the wheel base and the front and rear tread bases of the vehicle which is the object of adjustment, a worker moves the supporting frames 48 of the respective tire driving devices 18 in the longitudinal direction of the vehicle along the guide rails 62 for longitudinal sliding, so that the four tire driving devices 18 are positioned at positions corresponding to the four wheels of the vehicle which is the object of adjustment. The worker also moves the frames 22 in the transverse direction of the vehicle along the guide rails for transverse sliding. In this way, the worker adjusts the positions of the respective tire driving devices 18 on the stand 12.

Because the above-described movement is carried out by the driving force of the motors via the ball screw mechanisms, when the driving of the motors stops, the tire driving devices 18 are locked at their adjusted positions by the operation of the ball screw mechanisms.

Next, the vehicle 20 is moved onto the stand 12 with the steering wheel of the vehicle 20 set in the state in which it is positioned for straight forward running of the vehicle, such that the wheels of the vehicle 20 are positioned on the tire driving surfaces 36 of the tire driving devices 18 and the center line of the vehicle body is substantially parallel to the rotating direction of the endless loci 34 of the tire driving devices 18. The rods 74 are rotated and extended or contracted manually such that the distance sensors 76 oppose the centers of the respective wheels.

When the above-described operations are completed, the worker designates wheel alignment measurement to the control device 80. The control device 80 thereby executes the wheel alignment measurement processing illustrated in FIG. 12 in order, and executes the vehicle body orientation adjustment processing illustrated in FIG. 13 periodically each time a predetermined period of time elapses. Hereinafter, first, vehicle body orientation adjustment processing will be described with reference to FIG. 13.

Figure 14:
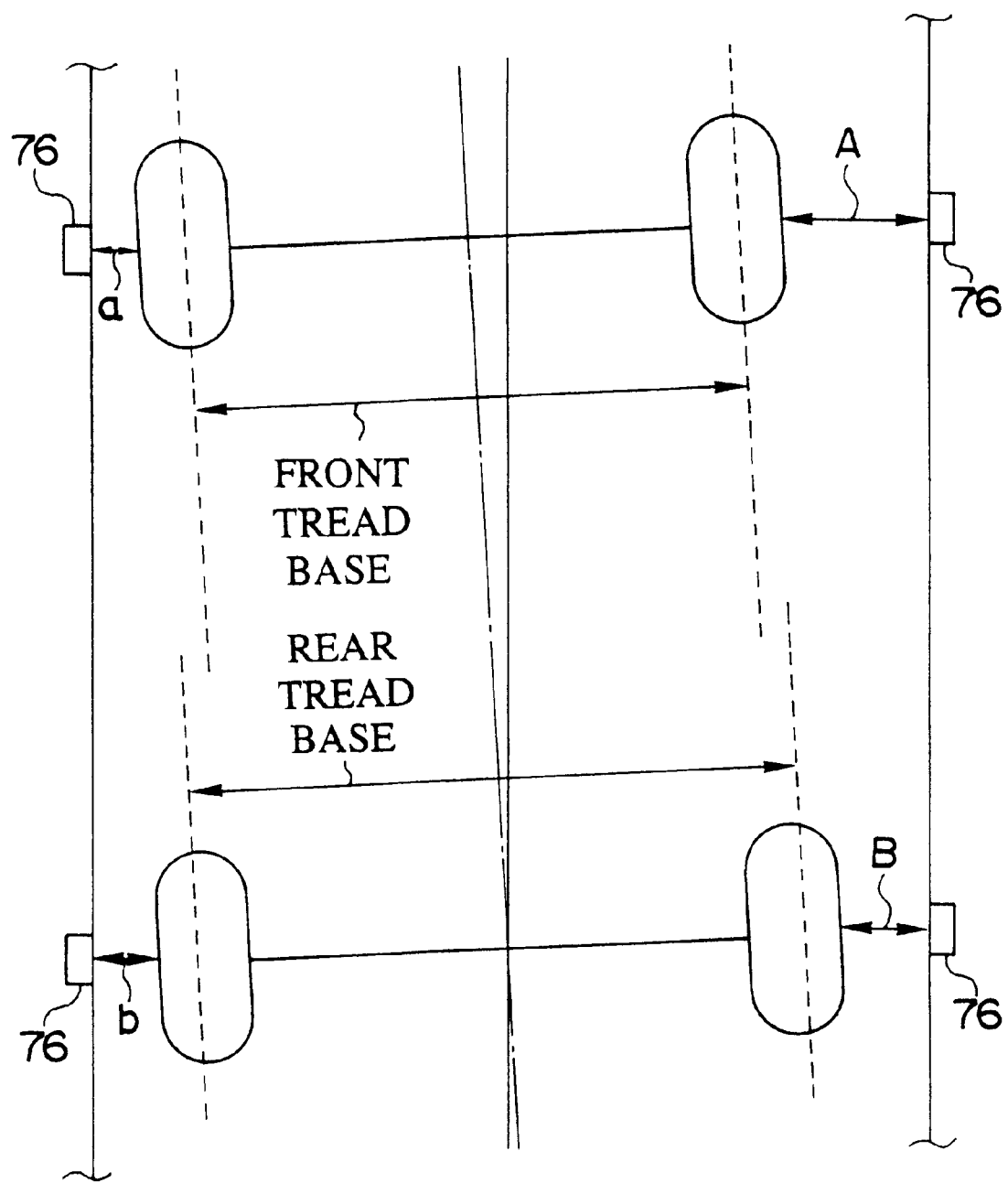
FIG. 14 is a diagram for explaining how vehicle orientation is adjusted.

In step 100, the four distance sensors 76 measure the distances to the centers of the wheels of the vehicles (the distances a, b, A, B illustrated in FIG. 14). In step 102, the value (a−b) obtained by subtracting the distance b, between the center of the left rear wheel of the vehicle and the distance sensor 76, from the distance a, between the center of the left front wheel of the vehicle and the distance sensor 76, is compared with the value (A−B) obtained by subtracting the distance B, between the center of the right rear wheel of the vehicle and the distance sensor 76, from the distance A, between the center of the right front wheel of the vehicle and the distance sensor 76. Based on the results of comparison, a determination as made as to whether the vehicle body is oriented correctly.

In a case in which (a−b)=(A−B) in step 102, it is determined that, even if the tread base of the front wheels of the vehicle 20 and the tread base of the rear wheels of the vehicle 20 are different, the center line of the vehicle body is parallel to the rotating direction of the respective tire driving devices 18 of the wheel alignment measuring device. Therefore, the determination in step 102 is affirmative, and the vehicle body orientation adjustment processing ends without any specific processing being carried out.

However, if (a−b)=(A−B), the determination in step 102 is negative, the routine proceeds to step 104 where the moving distances of the tire driving devices 18 needed to make (a−b)=(A−B) are computed, the motors 60 are driven on the basis of the results of computation, and the tire driving devices 18 are moved in the rotation axis direction such that the positions thereof are adjusted. In this way, the orientation of the vehicle body is adjusted such that the center line of the vehicle body becomes parallel to the rotating direction of the respective tire driving devices 18 of the wheel alignment measuring device. Due to the above-described operations, even if the center line of the vehicle body of the vehicle moved onto the stand 12 is not parallel to the rotating direction of the respective tire driving devices 18, the orientation of the vehicle body can be corrected such that the center line becomes parallel.

In the wheel alignment measuring processing (FIG. 12) which will be described hereinafter, the wheels of the vehicle 20 are rotated one-by-one by the tire driving devices 18. When the wheels of the vehicle 20 are rotated one-by-one, due to the rotation axis direction force generated at the tire being rotated, strain is generated at the tires which are not being rotated, the vehicle body is displaced slightly, and the positional angle of the wheel which is being rotated varies with respect to the tire driving surface 36. However, the above-described vehicle body orientation adjustment processing is carried out periodically even when the wheels are being rotated. The tire driving devices 18 are moved so that the strain at the tires which are not being rotated is eliminated and the displacement of the vehicle body is corrected. Therefore, the positional angle of the wheel which is being rotated with respect to the tire driving surface 36 is fixed, and the accuracy of measurement by the wheel alignment measuring processing is improved.

Figure 12:
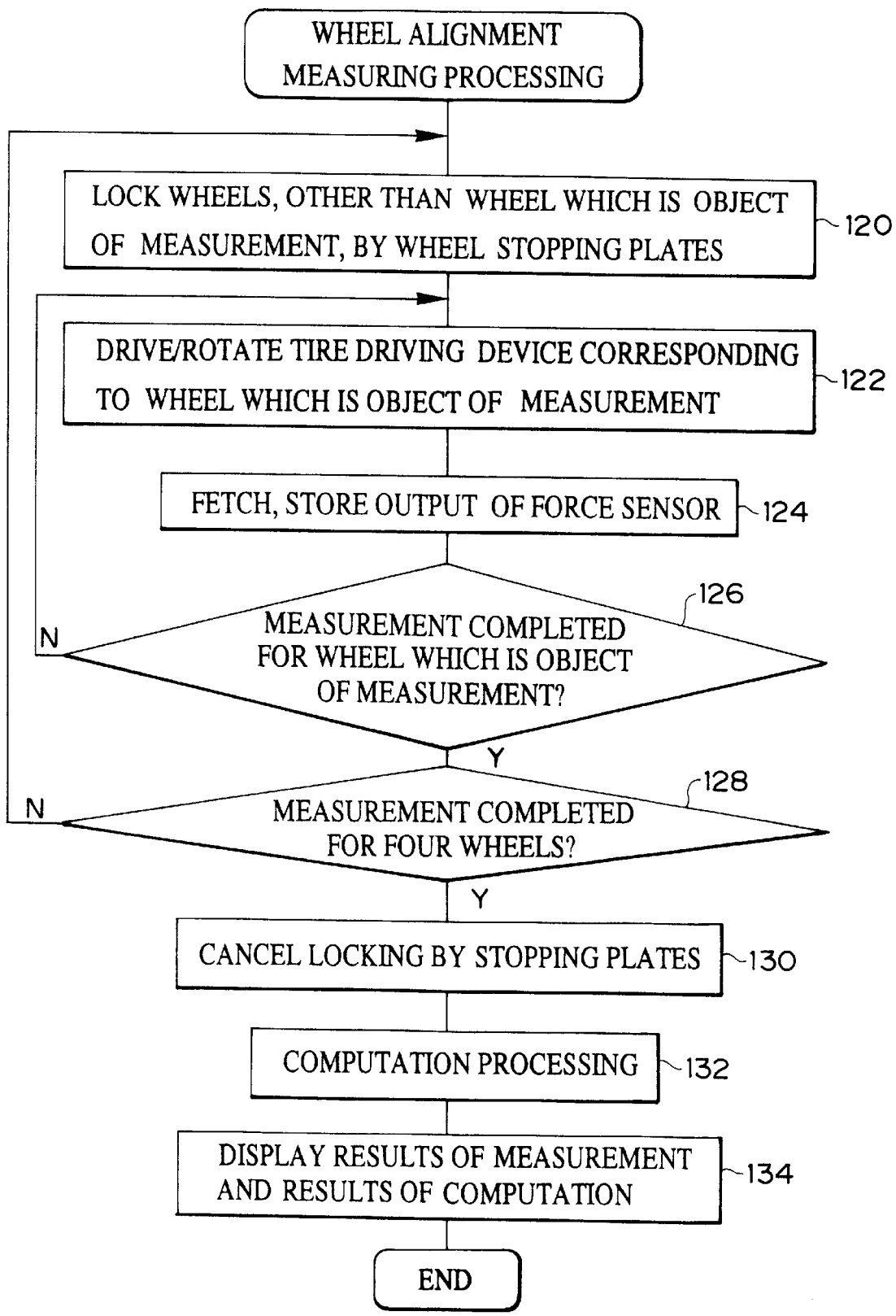
FIG. 12 is a flowchart illustrating wheel alignment measuring processing.

Next, wheel alignment measuring processing will be described with reference to the flowchart of FIG. 12. In step 120, the three wheels which are the wheels other than the wheel which is the object of measurement are, by the corresponding wheel stopping plates 64 being rotated by the hydraulic cylinders 70, locked such that these three wheels do not move in the longitudinal direction of the vehicle. Instead of locking the wheels by the wheel stopping plates 64, the jacking point provided at the vehicle 20 may be used to fix the vehicle body so as to prevent movement of the vehicle 20 in the vehicle longitudinal direction. However, in this case, it is necessary to ensure that no force other than the force generated by the driving of the wheel be applied to the vehicle body due to the fixing of the vehicle body.

In subsequent step 122, the tire driving device 18 corresponding to the wheel which is the object of measurement is driven/rotated. In this way, the wheel which is the object of measurement rotates on the tire driving surface 36, and repeatedly rides up onto the top surface of the projection 38 from the top surfaces of the plates 32 and rides down off of the top surface of the projection 38 onto the top surfaces of the plates 32. Due to the wheel riding up onto the projection 38 and riding down off of the projection 38, force in the rotating direction and force in the rotation axis direction are generated at the tire of the wheel which is the object of measurement, and the generated forces are measured by the force sensor 52. As a result, in step 124, the output (the results of measurement) from the force sensor 52 is fetched, and the fetched results of measurement are temporarily stored in a storing means such as a memory or the like.

In subsequent step 126, a determination is made as to whether measurement for the wheel which is the object of measurement has been completed. When the answer to the determination is negative, the routine returns to step 122, and steps 122 through 126 are repeated. In this way, until the answer to the determination in step 126 is positive, the force in the longitudinal direction of the vehicle (longitudinal force) and the force in the transverse direction of the vehicle (lateral force), which are generated by the wheel which is the object of measurement which is rotating on the tire driving surface 36, are measured repeatedly, and the results of measurement are stored.

When a condition is satisfied, such as when a predetermined period of time has elapsed or the tire has rotated a predetermined number of times or the amount of measured data stored in the memory has reached a predetermined amount or the like, the answer to the determination in step 126 is affirmative, and the routine proceeds to step 128. In step 128, a determination is made as to whether the above-described measuring processing has been carried out for all of the wheels of the vehicle 20. When the answer to the determination in step 128 is negative, the routine returns to step 120, and the above-described processing is repeated by using another wheel as the wheel which is the object of measurement.

When measuring processing has been carried out for all of the wheels of the vehicle and the data for the respective wheels has been collected, the answer to the determination in step 128 is affirmative, and the routine proceeds to step 130 where the locking of the wheels by the stopping plates is canceled. Thereafter, in subsequent step 132, the results of measurement which were temporarily stored in the memory or the like are fetched, and the variations in longitudinal force and lateral force at the time the wheel rode up on the projection 38 and rode down off of the projection 38 are computed. Then, the adjustment direction of the toe angle to be adjusted in either the toe-in direction or the toe-out direction for each wheel is computed on the basis of the width of the variation and the direction of the variation (increasing direction/decreasing direction) of the lateral force during the time in which the longitudinal force at the wheel became a maximum or a value near a maximum.

Next, in step 134, for each wheel, the adjustment direction of the toe angle and the width of the variation in lateral force during the time when the longitudinal force at the time of riding up onto the projection 38 and riding down off of the projection 38 became a maximum or a value near a maximum, are displayed on the display device 82, and processing is completed. In this way, on the basis of the information displayed on the display device 82, the worker can easily judge whether it is necessary to adjust the toe angles of the respective wheels, and if the toe angle should be adjusted, to what extent it should be adjusted in either adjustment direction.

After the worker adjusts the toe angle of each wheel of the vehicle 20, if reconfirmation is necessary, the worker again designates execution of the above-described wheel alignment measuring processing, and in the same way as described above, on the basis of the longitudinal force and the lateral force, it is determined whether the wheel alignment after toe angle adjustment is correct. In this way, regardless of the type of tires mounted to the vehicle 20, the positional angles of the respective wheels of the vehicle 20 can be adjusted correctly such that a high running stability on an actual road surface and corresponding to the characteristics of the tire is obtained and one-sided wear resistance is improved.

Further, in the above description, a device which combines the main raising/lowering device 10, which lifts up the tire driving devices 18 and the vehicle 20 in the vertical direction, and the secondary raising/lowering device 14, which lifts up only the vehicle body, is used as the wheel alignment measuring device. Therefore, changing of the tires and servicing of the vehicle can be carried out easily.

The above description includes an example of a case in which a worker adjusts the toe angles of the respective wheels on the basis of the adjustment direction of the toe angle displayed on the display device 82. However, the present invention is not limited to the same. Generally, a pair of steerable wheels are constructed such that their toe angles can be adjusted, while a pair of unsteerable wheels are constructed such that the toe angle per each wheel or even for both wheels on the same axle cannot be adjusted. In such cases, for a pair of steerable wheels mounted to the same axle, the angle between the axle and the vehicle body can be adjusted on the basis of the information displayed on the display device 82 such that the widths of variation in the lateral forces during the period of time when the longitudinal forces at the time of riding up on the projections 38 and riding down off of the projections 38 become maxima or values near maxima, become equal.

The main raising/lowering device 10 and the secondary raising/lowering device 14 of the wheel alignment measuring device may be formed integrally. Further, the wheel alignment measuring device may be structured by placing the tire driving devices 18 on a turning device which can turn around a vertical axis and which can display the angle of turning or can output the angle of turning as a signal. In this case, if the collecting of data by rotating the wheel by the tire driving device 18 and the turning of the turning device (corresponding to the varying of the toe angle of the wheel) are repeated alternately, on the basis of the collected data, not only the adjustment direction of the toe angle but also the optimal toe angle value can be determined.

Further, in a case in which the vehicle which is the object of adjustment is a vehicle in which it is possible to adjust the camber angle, the camber angle as well can be adjusted to a value within an allowable range of design values. In a case in which the camber angle is adjusted, work efficiency improves if the above-described wheel alignment measuring device is used together with a conventional alignment measuring device or angle measuring device such as an angle meter.

Figure 15A:
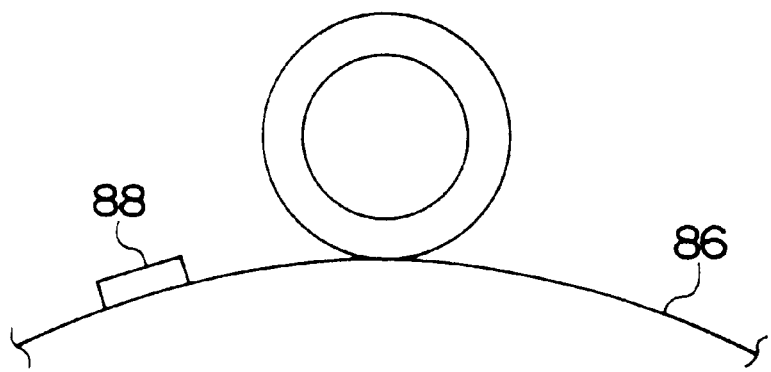
FIGS. 15A through 15C are schematic views of other examples of the tire driving device.
Figure 15B:
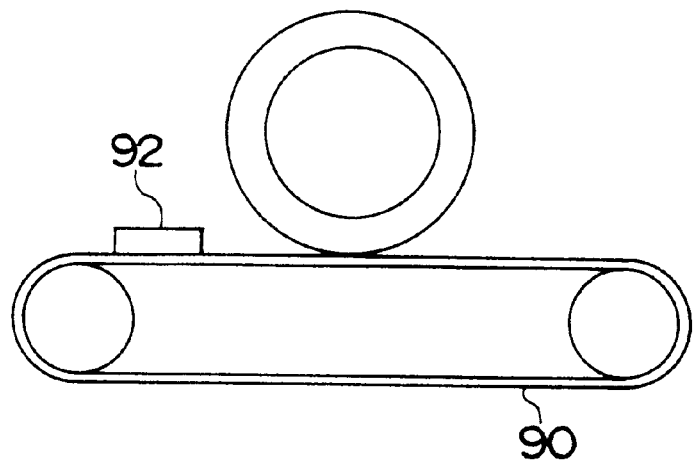

In the above explanation, an example is described in which the tire driving surface is formed by the endless locus 34 which is formed by connecting the plates 32. However, the present invention is not limited to the same. For example, as illustrated in FIG. 15A, the outer peripheral surface of a large diameter roller 86 may be used as the tire driving surface. A flat-plate-shaped projection 88 may be mounted to the outer peripheral surface of the roller 86 to form the step. Or, as illustrated in FIG. 15B, the outer peripheral surface of an endless belt 90 may be used as the tire driving surface. A flat-plate-shaped projection 92 may be mounted to the outer peripheral surface of the endless belt 90 so as to form the step.

Figure 15C:
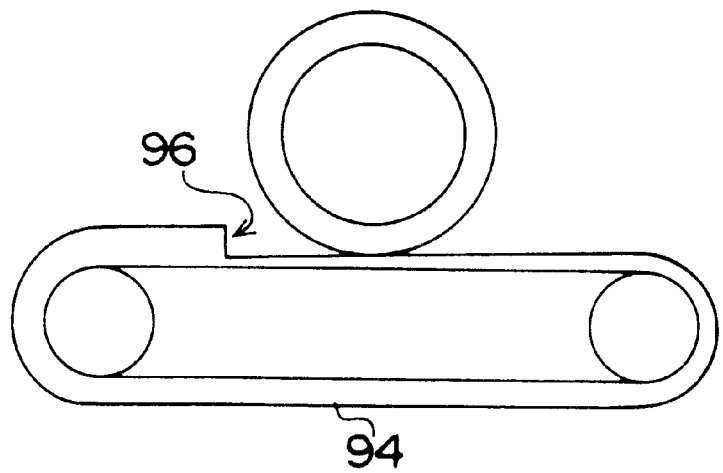

Further, in the above description, the step is formed by mounting a projection to the endless locus. However, the present invention is not limited to the same. As illustrated in FIG. 15C, an endless belt 94 may be formed such that the thickness thereof along the peripheral direction increases or decreases at a substantially constant rate of change so that a portion whose thickness suddenly changes is formed at the outer peripheral surface of a predetermined place along the peripheral direction. In this way, the tire driving surface and a step 96 (the portion whose thickness suddenly changes) may be formed integrally. Experiments performed by the present inventors have confirmed that the time when the degree of difference in the way the lateral force changes in accordance with the change in the positional angle is high is the time when the wheel rides up on the step. Therefore, when a wheel is driven by the tire driving device illustrated in FIG. 15C, the tire driving device may be disposed so as to be oriented such that as the wheel rotates, the wheel rides up on and passes over the step 96. Note that the number, the configuration and the like of the projections and steps are not limited to those in the above-described examples, and various modifications are possible within the scope of the present invention.

The above description includes an example in which the motor is mounted to the outer side of the tire driving device. However, a roller in which the motor is built-in into the inner portion of the driving roller may also be used.

Further, the above includes an example in which two pairs of tire driving surfaces are used. However, it is possible to use one pair of tire driving surfaces in order to adjust only the steerable wheel alignment, or adjust the front axle or the rear axle.

The present invention has excellent effects in that positional angles of the wheels corresponding to the characteristics of the tire can be set easily, a running stability suited to an actual road surface can be obtained, and a reduction in one-sided wear can be realized.

What is claimed is:

1. A method of adjusting vehicle wheel alignment comprising the steps of:

placing a wheel of a vehicle, said wheel including a tire mounted thereto, on a tire driving surface on which a step of a predetermined height is formed at at least one place along a rotating direction in which the tire driving surface is driven by a rotational force;

measuring variations in forces applied in the rotating direction of the tire driving surface and a rotation axis direction which is orthogonal to the rotating direction at the time the wheel passes over the step while the tire driving surface is being driven so that the wheel is rotated in a proceeding direction of the vehicle; and adjusting a positional angle of the wheel, on the basis of said measurements, such that a variation in lateral force generated by the tire when the wheel passes over the step is a minimum.

2. A method of adjusting vehicle wheel alignment according to claim 1, wherein the tire driving surface is formed by connecting a plurality of plates which are driven continuously along the rotating direction, and the step is formed by a projecting portion formed by a portion of the plurality of plates projecting in a direction orthogonal to the rotating direction and to the rotation axis direction.

3. A method of adjusting vehicle wheel alignment according to claim 2, wherein said tire driving surface is supported by a frame, and the variations in the forces applied in the rotating direction and in the rotation axis direction are measured by a force sensor which is mounted to a vehicle longitudinal direction front end of the frame.

4. A method of adjusting vehicle wheel alignment according to claim 2, wherein the projecting portion is shaped as a flat plate whose length along the rotating direction is a length which allows the tire to completely ride up on the projecting portion, and whose length along the rotation axis direction is a length which is greater than a width of the tire.

5. A method of adjusting vehicle wheel alignment according to claim 1, wherein said positional angle of the wheel which allows the variation in the lateral force generated by the tire to be a minimum is an angle formed by adjusting the toe angle of the wheel.

6. A method of adjusting vehicle wheel alignment comprising the steps of:

placing wheels of a vehicle, said wheels each including a tire mounted thereto, on at least a pair of tire driving surfaces on each of which a step of a predetermined height is formed at at least one place along a rotating direction in which the tire driving surface is driven by a rotational force, and which are disposed such that the rotating directions of the tire driving surfaces are parallel and such that the tire driving surfaces are positioned in substantially the same horizontal plane;

measuring, for each tire driving surface, variations in forces applied in the rotating direction of the tire driving surface and a rotation axis direction which is orthogonal to the rotating direction at the time the wheel passes over the step while the tire driving surface is being driven so that the wheel is rotated in a proceeding direction of the vehicle; and adjusting, for each wheel, a positional angle of the wheel on the basis of a way in which force applied in the rotation axis direction of the tire driving surface varies during a period of time determined in accordance with variations in force applied in the rotating direction of the tire driving surface.

7. A method of adjusting vehicle wheel alignment according to claim 6, wherein each tire driving surface is formed by connecting a plurality of plates which are driven continuously along the rotating direction, each step comprises a projecting portion which projects in a direction orthogonal to the rotating direction and to the rotation axis direction is formed at a portion of the plurality of plates.

8. A method of adjusting vehicle wheel alignment according to claim 7, wherein each tire driving surface is supported by a frame, and the variations in the forces applied in the rotating direction and in the rotation axis direction are measured by a force sensor which is mounted to a vehicle longitudinal direction front end of the frame.

9. A method of adjusting vehicle wheel alignment according to claim 7, wherein the projecting portion is shaped as a flat plate whose length along the rotating direction is a length which allows the tire to completely ride up on the projecting portion, and whose length along the rotation axis direction is a length which is greater than a width of the tire.

10. A method of adjusting vehicle wheel alignment according to claim 6, wherein said way in which force applied in the rotation axis direction of the tire driving surface varies differs in accordance with the toe angle and the camber angle of the wheel.

11. A method of adjusting wheel vehicle alignment comprising the steps of:

placing wheels of a vehicle, each wheel including a tire mounted thereto, on at least a pair of tire driving surfaces on each of which a step of a predetermined height is formed at at least one place along a rotating direction in which the tire driving surface is driven by a rotational force, and which are disposed such that the rotating directions of the tire driving surfaces are parallel and such that the tire driving surfaces are positioned in substantially the same horizontal plane;

measuring, for each tire driving surface, variations in forces applied in the rotating direction of the tire driving surface and a rotation axis direction which is orthogonal to the rotating direction at the time the wheel passes over the step while the tire driving surface is being driven so that the wheel is rotated in a proceeding direction of the vehicle; and adjusting, for each wheel, a positional angle of the wheel such that the variation in force, which is applied in the rotation axis direction of the tire driving surface at the time the force applied in the rotating direction of the tire driving surface is a maximum or a value near a maximum, is a minimum.

12. A method of adjusting vehicle wheel alignment according to claim 11, wherein each tire driving surface is formed by connecting a plurality of plates which are driven continuously along the rotating direction, and each step comprises a projecting portion which projects in a direction orthogonal to the rotating direction and to the rotation axis direction is formed at a portion of the plurality of plates.

13. A method of adjusting vehicle wheel alignment according to claim 12, wherein each tire driving surface is supported by a frame, and the variations in the forces applied in the rotating direction and in the rotation axis direction are measured by a force sensor which is mounted to a vehicle longitudinal direction front end of the frame.

14. A method of adjusting vehicle wheel alignment according to claim 12, wherein the projecting portion is shaped as a flat plate whose length along the rotating direction is a length which allows the tire to completely ride up on the projecting portion, and whose length along the rotation axis direction is a length which is greater than a width of the tire.

15. A method of adjusting vehicle wheel alignment according to claim 11, wherein said positional angle of the wheel which allows the variation in force which is applied in the rotation axis direction of the tire driving surface to be a minimum, is an angle formed by adjusting the toe angle of the wheel.

* * * * *